(12) United States Patent
Chung et al.

(10) Patent No.: US 7,376,333 B2
(45) Date of Patent: May 20, 2008

(54) INFORMATION STORAGE MEDIUM INCLUDING MARKUP DOCUMENT AND AV DATA, RECORDING AND REPRODUCING METHOD, AND REPRODUCING APPARATUS THEREFORE

(75) Inventors: Hyun-kwon Chung, Gyeonggi-do (KR); Kil Soo Jung, Gyeonggi-do (KR); Jung-kwon Heo, Seoul (KR); Sung-wook Park, Seoul (KR); Jung-wan Ko, Suwon-si (KR); Seong-jin Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1276 days.

(21) Appl. No.: 10/278,092

(22) Filed: Oct. 23, 2002

(65) Prior Publication Data
US 2003/0194207 A1   Oct. 16, 2003

(30) Foreign Application Priority Data
Oct. 23, 2001  (KR) ............. 2001-0065388
Mar. 18, 2002  (KR) ............. 2002-0014586
May 31, 2002   (KR) ............. 2002-0030609

(51) Int. Cl.
*H04N 5/91* (2006.01)
(52) U.S. Cl. .......................... 386/52; 386/83

(58) Field of Classification Search .......... 725/37, 725/109, 110, 131, 135, 142, 328; 709/203, 709/206, 217, 219; 715/513–516, 530; 345/723, 345/728; 386/46, 52, 54
See application file for complete search history.

(56) References Cited

U.S. PATENT DOCUMENTS

| 6,760,885 B1* | 7/2004 | Hyman et al. ........... 715/500.1 |
| 6,785,902 B1* | 8/2004 | Zigmond et al. ............ 725/38 |
| 2001/0056580 A1 | 12/2001 | Seo et al. |
| 2002/0069411 A1* | 6/2002 | Rainvill et al. ............... 725/37 |
| 2002/0078144 A1* | 6/2002 | Lamkin et al. ............ 709/203 |
| 2002/0088011 A1* | 7/2002 | Lamkiin et al. ........... 725/142 |

FOREIGN PATENT DOCUMENTS

| EP | 0 762 422 | 3/1997 |
| EP | 0 838 820 | 4/1998 |

OTHER PUBLICATIONS

U.S. Appl. No. 10/280,127, filed Oct. 25, 2002, Chung et al., Samsung Electronics Co., Ltd.

* cited by examiner

*Primary Examiner*—Thai Q. Tran
*Assistant Examiner*—Mishawn Dunn
(74) *Attorney, Agent, or Firm*—Stein, McEwen & Bui, LLP

(57) ABSTRACT

An information storage medium including a markup document and AV data for use in a reproducing apparatus includes AV data including audio data and video data, a markup document, and scene synthesis information which describes one of at least two display modes for displaying a markup document scene obtained from the markup document and an AV scene obtained from the AV data together.

56 Claims, 20 Drawing Sheets

FIG. 7A
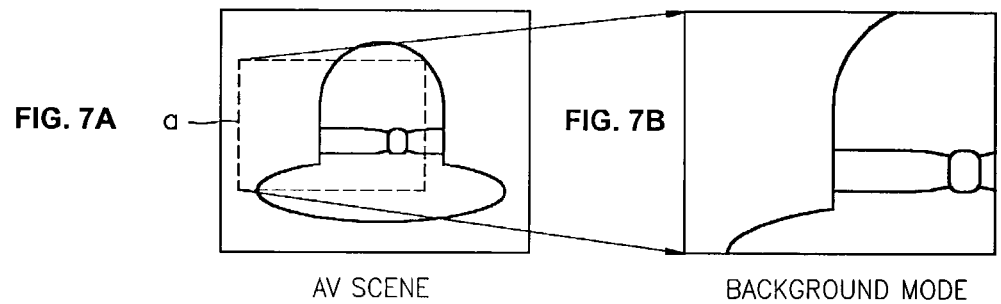
AV SCENE
FIG. 7B
BACKGROUND MODE
FIG. 7C
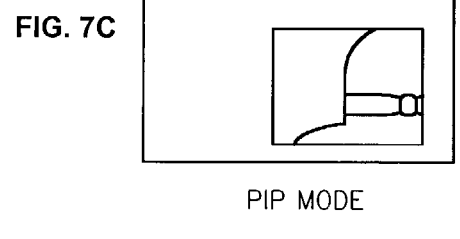
PIP MODE
FIG. 7D
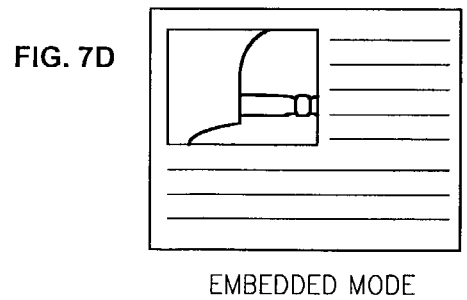
EMBEDDED MODE

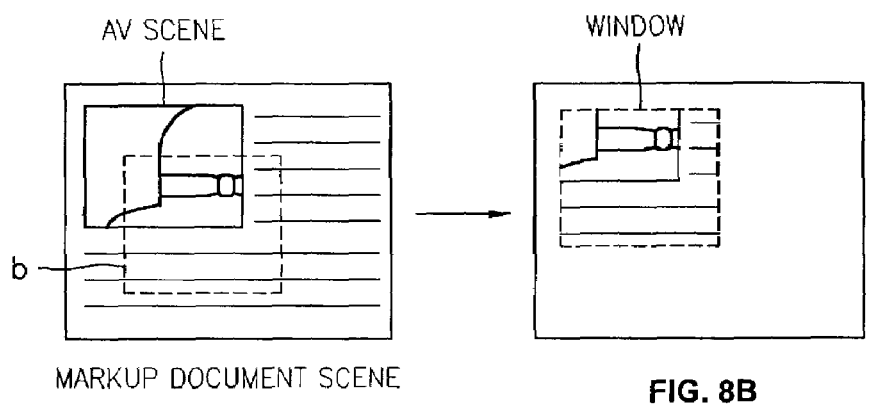
FIG. 8A
FIG. 8B
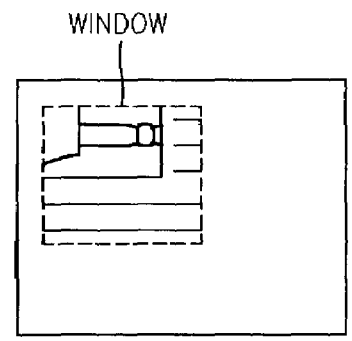
FIG. 8C

FIG. 13A   FIG. 13B   FIG. 13C
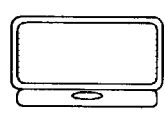 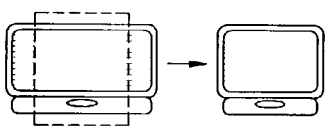 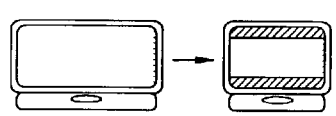
FIG. 14
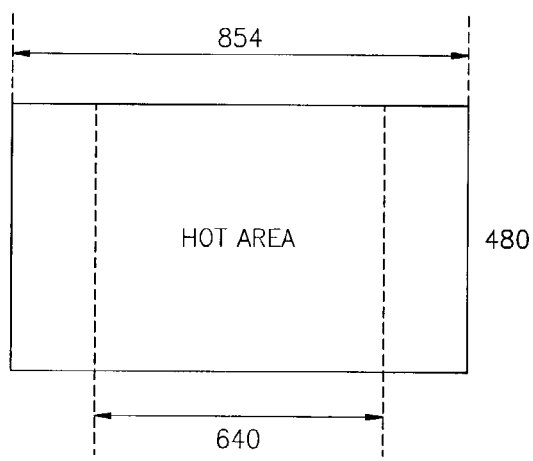

FIG. 17A
16x9
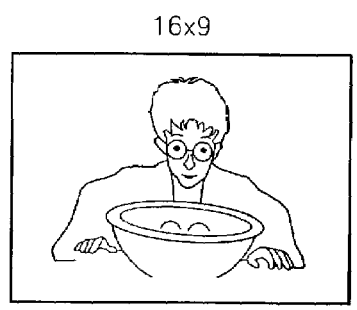
FIG. 17B  FIG. 17C  FIG. 17D
4x3  4x3  4x3
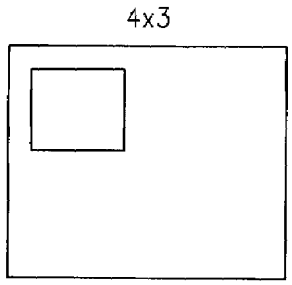 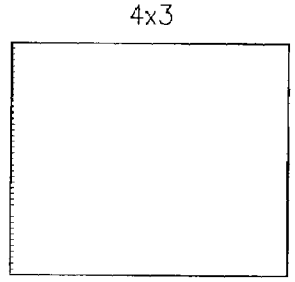 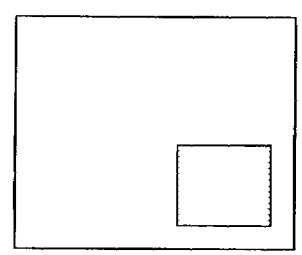

4X3

480

640

16X9

480

854

480

640

480

854

480

640

480

854

INFORMATION STORAGE MEDIUM INCLUDING MARKUP DOCUMENT AND AV DATA, RECORDING AND REPRODUCING METHOD, AND REPRODUCING APPARATUS THEREFORE

CROSS-REFERENCE TO RELATED APPLICATIONS

This application claims the benefit of Korean Patent Application Nos. 2001-65388, 2002-14586, and 2002-30609, filed Oct. 23, 2001, March 18, 2002, and May 31, 2002, respectively in the Korean Intellectual Property Office, the disclosures of which are incorporated herein in their entirety by reference.

BACKGROUND OF THE INVENTION

1. Field of the Invention

The present invention relates to a method of displaying audio/video (AV) data together with a markup document, and more particularly, to an information storage medium including a markup document and AV data so that the markup document and the AV data can be reproduced and displayed together in various ways in an interactive mode, a recording and a reproducing method, and a reproducing apparatus therefore.

2. Description of the Related Art

Digital video discs (DVDs) (hereinafter, referred to as "interactive DVDs") on which a markup document is recorded together with audio/video (hereinafter, referred to as AV data), have been initially developed for movie applications. However, the interactive DVDs have started to be widely used in the computer industry. The AV data recorded on the interactive DVDs can be reproduced in two ways: a video mode which is displayed identically as compared to a conventional DVD, and an interactive mode in which reproduced the AV data is displayed in a display window defined by a markup document. If the interactive mode is selected by a user, a viewer installed in a DVD reproducing apparatus displays the markup document recorded on an interactive DVD. The AV data selected by the user is displayed in the display window of the markup document. For example, when the AV data is a movie, the movie is run in the display window of the markup document, and various additional information including scenario, history, and actors' pictures related to the movie are displayed in the remaining part of a screen excluding the display window of the markup document. The additional information includes image files or text files.

However, until now, in the interactive mode, the AV data is based on a simple displaying method in which the AV data is displayed through the display window defined according to grammar of markup languages.

SUMMARY OF THE INVENTION

To solve the above and other problems, it is an object of the present invention to provide an information storage medium including AV data and a markup document so that the AV data and the markup document can be reproduced and displayed in various ways in an interactive mode, a recording method, a reproducing method, and a reproducing apparatus therefore.

It is another object of the present invention to provide an information storage medium including the AV data and a markup document so that the AV data and the markup document can be displayed in various ways in an interactive mode according to a resolution and an aspect ratio (screen ratio), which are set by a user or set in a reproducing apparatus, a recording method, a reproducing method, and a reproducing apparatus therefore.

It is still another object of the present invention to provide an information storage medium including interactive contents manufactured at a fixed aspect ratio so that the interactive contents can be effectively displayed on a display having various aspect ratios, a recording method, a reproducing method, and a reproducing apparatus therefore.

Additional objects and advantages of the invention will be set forth in part in the description which follows and, in part, will be obvious from the description, or may be learned by practice of the invention.

Accordingly, to achieve the above and other objects according to an embodiment of the present invention, there is provided an information storage medium includes AV data including audio data and video data, a markup document, and scene synthesis information which describes one of at least two display modes for displaying a markup document scene obtained from the markup document and an AV scene obtained from the AV data together.

According to an aspect of the invention, the scene synthesis information includes a link tag recorded in the markup document, and the scene synthesis information includes a cascading style sheet (CSS) inserted in the link tag.

According to another aspect of the invention, the CSS includes at least one of display mode designation information for designating a display mode of the AV scene, AV trimming area designation information for designating an area to increase and reduce a desired portion of the AV scene, background color designation information for designating a background color of the AV scene, trimming area designation information for designating a trimming area of a scene in which the AV scene is synthesized with the markup document, window designation information for designating a window in which a scene where the AV scene is synthesized with the markup document is displayed on the screen of a display, screen display type information representing an aspect ratio of a scene in which the AV scene is synthesized with the markup document scene, and window designation information of the AV scene for designating an area of a window in which a trimmed AV scene is displayed on the screen of the display.

According to a further aspect of the invention, the scene synthesis information further includes an object having property variables for controlling the CSS and a program for controlling the CSS on the basis of the object.

According to another embodiment of the present invention, a method for recording AV data, including audio data and video data on an information storage medium, comprises recording the AV data, recording a markup document to be displayed together with the AV data, and recording scene synthesis information which describes one of at least two display modes for displaying a markup document scene obtained from the markup document and an AV scene obtained from the AV data together.

According to an aspect of the invention, the AV data is recorded in a video directory, the markup document is recorded in an interactive directory, and the scene synthesis information is recorded in the interactive directory.

According to another aspect of the invention, contents which are to be displayed are recorded in a maximum area shown regardless of an aspect ratio of the display (i.e., in a hot area), and unimportant contents are recorded or any contents are not recorded in the other area, wherein, when the markup document having a first aspect ratio is displayed on a display having a second aspect ratio having a resolution lower than that of the first aspect ratio, the hot area is selected using the trimming area designation information of the synthesized scene, and the selected hot area is mapped to a designated area on the screen of the display using the window designation information of the synthesized scene.

According to still another embodiment of the present invention, a method for reproducing AV data, including audio data and video data recorded on an information storage medium comprises interpreting a markup document to be displayed together with the A data, interpreting scene synthesis information which describes at least two display modes for displaying a markup document scene obtained by reproducing the markup document and an AV scene obtained by reproducing the AV data together, and displaying the AV scene and the markup document scene in one of the display modes according to the interpreted scene synthesis information.

According to still yet another embodiment of the present invention, a method for reproducing AV data, including audio data and video data having a predetermined aspect ratio recorded on an information storage medium and a markup document having a predetermined aspect ratio and displaying the AV data and the markup document, the method comprises reading scene synthesis information corresponding to a scene mode set in a reproducing apparatus or set by a user, and interpreting the read scene synthesis information, displaying an AV scene obtained by reproducing the AV data and a markup document scene obtained by reproducing the markup document to be displayed together with the AV data, and changing the output state of the markup document scene in response to a scene mode change.

According to a further embodiment of the present invention, an apparatus for reproducing AV data, including audio data and video data recorded on an information storage medium, includes a reading unit which reads the AV data and a markup document to be displayed together with the AV data, a decoder which decodes the AV data read by the reading unit and outputs an AV scene, and a controller which interprets the markup document read by the reading unit, outputs a markup document scene, interprets scene synthesis information which describes at least two display modes for displaying the markup document scene together the AV scene, and displays the AV scene and the markup document scene in one of the display modes according to the interpreted scene synthesis information.

According to a yet further embodiment of the present invention, an apparatus for reproducing AV data, including audio data and video data recorded on an information storage medium, includes a reading unit which reads the AV data and a markup document to be displayed together with the AV data, a decoder which decodes the AV data read by the reading unit and outputs an AV scene, and a controller which interprets scene synthesis information corresponding to a scene mode set by one of the reproducing apparatus and a user, interprets the markup document to be displayed together with the AV data read by the reading unit using the interpreted scene synthesis information, displays a markup document scene, and changes the output state of the markup document scene in response to a scene mode change.

BRIEF DESCRIPTION OF THE DRAWINGS

The above objects and advantages of the present invention will become more apparent by describing in detail embodiments thereof with reference to the accompanying drawings in which:

FIGS. 7A through 7D show reference diagrams more specifically illustrating a display mode of the AV scene and the markup document scene according to a video-viewport and a video-placement;

FIGS. 8A through 8C show reference diagrams more specifically illustrating a display mode of the AV scene and the markup document scene according to a viewport and window;

FIGS. 13A through 13C show reference diagrams illustrating scenes in which AV data for a 16×9 screen is displayed on a display having a 4×3 screen in a letter box shape and a pan-and-scan shape;

FIG. 14 shows a reference diagram illustrating a markup document using a hot area;

FIGS. 17A through 17D show reference diagrams in which AV data for a 16×9 screen is synthesized with a markup document for a 4×3 screen in embedded, background, and PIP modes, respectively.

DETAILED DESCRIPTION OF THE EMBODIMENTS

Figure 1:
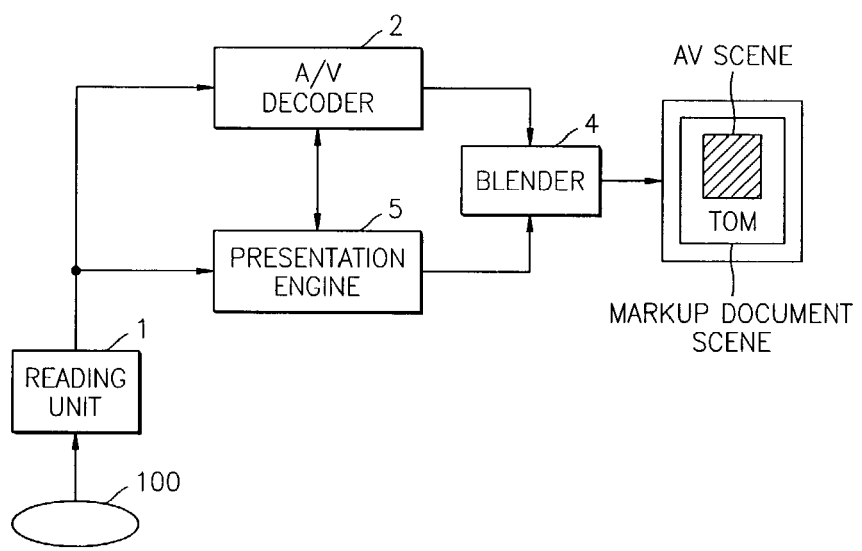
FIG. 1 is a block diagram of a DVD reproducing apparatus according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Meanings of terms used in the description are as follows. "Markup document" is a markup document and a markup resource including various image files and graphic files inserted in the markup document. "Markup document scene" is a scene in which the "Markup document" is displayed by a viewer. "AV scene" is a scene in which audio/video (AV) data is decoded and displayed. "Scene synthesis information" is information on the definition of a method for displaying the markup document scene and the AV scene together according to the present invention.

FIG. 1 is a block diagram of a reproducing apparatus according to an embodiment of the present invention. Referring to FIG. 1, the reproducing apparatus displays the AV scene and a markup document scene together. The AV scene and the markup document scene are obtained by decoding AV data and a markup document recorded on an optical disc 100 according to the present embodiment in an interactive mode by a displaying method according to the present invention. The reproducing apparatus includes a reading unit 1, an AV decoder 2, a presentation engine 3, and a blender 4.

The reading unit 1 reads the AV data, the markup document, and scene synthesis information from the optical disc 100 and provides the read AV data, the read markup document, and the read scene synthesis information to the AV decoder 2 and the presentation engine 3. In addition, the reading unit 1 may include a buffer memory (not shown) and a cache memory (not shown), for buffering the read AV data and caching the read markup document, respectively. However, the buffer memory and/or cache memory are not required in all aspects of the invention.

The presentation engine 3 supports a display mode according to the present invention. From the viewpoint of a software unit, the presentation engine 3 includes a viewer, which is an application to interface with an operating system of the reproducing apparatus through an application program interface (API), and a client interpretation engine. The API is a predetermined special method for requesting processing of an operation system or another application. The client interpretation engine is implemented with a JavaScript or Java interpretation engine, interprets a program coded with JavaScript or Java, like a web browser and executes the program. Furthermore, the presentation engine 3 may further include a Plug-In. The Plug-In enables files in various formats included in the markup document or called by the markup document, to open. It is understood that other languages and programs can be used with the markup document.

The presentation engine 3 interprets the scene synthesis information and transmits a decoding command and a display command according to the result of interpretation to the AV decoder 2 and the blender 4, respectively. The presentation engine 3 also provides the markup document scene to the blender 4. The AV decoder 2 decodes the AV data according to the provided decoding command and outputs the decoded AV data to the blender 4. The blender 4 displays the markup document scene and the AV scene together according to the display command.

In order to perform a reproducing method according to an aspect of the present invention, the presentation engine 3 calls a style sheet linked to or embedded in the markup document manufactured by the reading unit 1 and interprets the style sheet. Information on a method for synthesizing (displaying) the markup document scene and the AV scene is described in the style sheet. Of course, it is understood that methods other than style sheets can be used to convey such information.

In order to perform the reproducing method according to another aspect of the present invention, the presentation engine 3 interprets a screen mode (aspect ratio, resolution, and video output mode) set in the reproducing apparatus or set by the user. The presentation engine 3 outputs a command according to the set screen mode using the scene synthesis information which is defined using a default style sheet set in the reproducing apparatus or a style sheet provided by a manufacturer. For instance, the style sheets could use a viewport for designating a trimming area of a scene in which the AV scene and the markup document scene are synthesized with each other, a window for designating a window of the screen in which the AV scene and the markup document scene are synthesized with each other, and a video-viewport for designating an area to increase and reduce a desired portion of the AV scene.

If the screen mode is changed by the user, the presentation engine 3 outputs a command according to the changed screen mode using the scene synthesis information (e.g., viewport, window, and video-viewport).

In addition, a switching unit may be included in the AV decoder 2.

When a display is set to a 4×3 screen size, the AV decoder 2 converts an AV stream into a letter box or pan-and-scan shape and outputs the converted AV stream. When the display is set to a 16×9 screen size, the AV decoder 2 outputs the AV stream in a 16×9 screen size without conversion. This is because the AV stream is generally encoded in the 16×9 screen size in the DVD reproducing apparatus. However, when the display mode in the interactive mode is an embedded mode or picture in picture (PIP) mode, the AV decoder 2 can output the AV stream in the 16×9 screen size without converting the AV stream into a letter box or pan-and-scan shape according to an "Initial Display aspect ratio," in which an aspect ratio preferred by the user is initially set in the presentation engine 3 even in a display having the 4×3 screen size.

Specifically, when the AV data for the 16×9 screen size is displayed on the display having the 4×3 screen size, the presentation engine 3 controls the AV decoder 2 to output the AV data in the 16×9 screen size in the embedded mode of the interactive mode or the PIP mode. The output AV data is output in a pan-and-scan or letter box shape in a background mode of the interactive mode or the video mode. However, the AV data may also be output in the pan-and-scan or letter box shape from the AV decoder 2 even in the embedded mode of the interactive mode or PIP mode.

In order to perform the reproducing method according to still another embodiment of the present invention, the presentation engine 3 interprets the viewport and the window (document-viewport, document-window) only for the markup document defined in the scene synthesis information, respectively, and the viewport and the window (video-viewport, video-window) only for the AV data.

In order to perform the reproducing method according to yet still another aspect of the present invention, unlike the AV decoder 2 having the switching unit, even though the display is set to the 4×3 screen size in the embedded mode or PIP mode, the AV decoder 2 having no switching unit outputs the AV stream for the 16×9 screen size in such a way that the display is set to the 16×9 screen size without outputting the AV stream in the letter box or pan-and-scan shape according to the viewport and window only for the interpreted markup document and the viewport and window only for the AV data.

Figure 2:
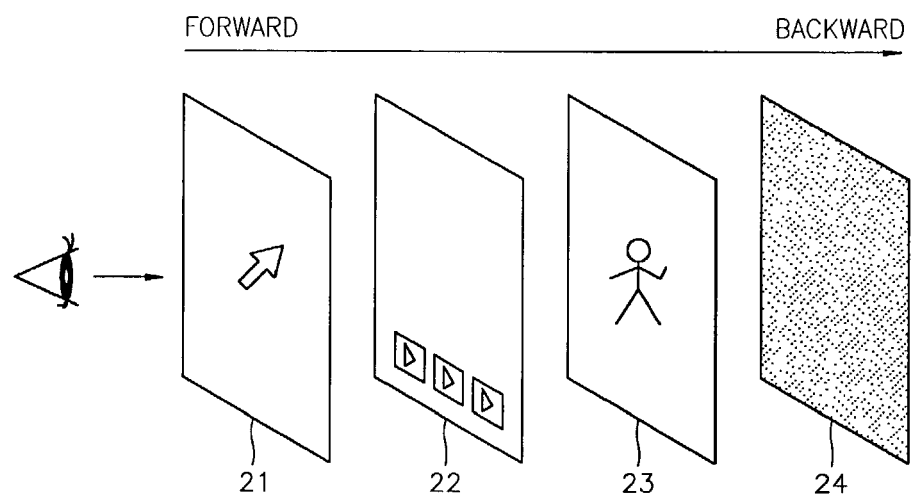
FIG. 2 is a reference diagram illustrating a screen alignment order (Z-order) of a display (not shown) connected to the apparatus of FIG. 1.

FIG. 2 is a reference diagram illustrating a scene alignment order (Z-order) of a display (not shown) connected to the reproducing apparatus of FIG. 1. Referring to FIG. 2, a final scene shown to the user is generated by four scenes 21, 22, 23, 24 added physically (i.e., stacked sequentially). A scene 21, on which a pointer is displayed, is placed foremost. a markup document scene 22 according to the markup document is behind the scene 21. An AV scene 23 according to the AV data is behind the markup document scene 22. A background scene 24 generally displayed in a single color is behind the AV scene 23.

Figure 3:
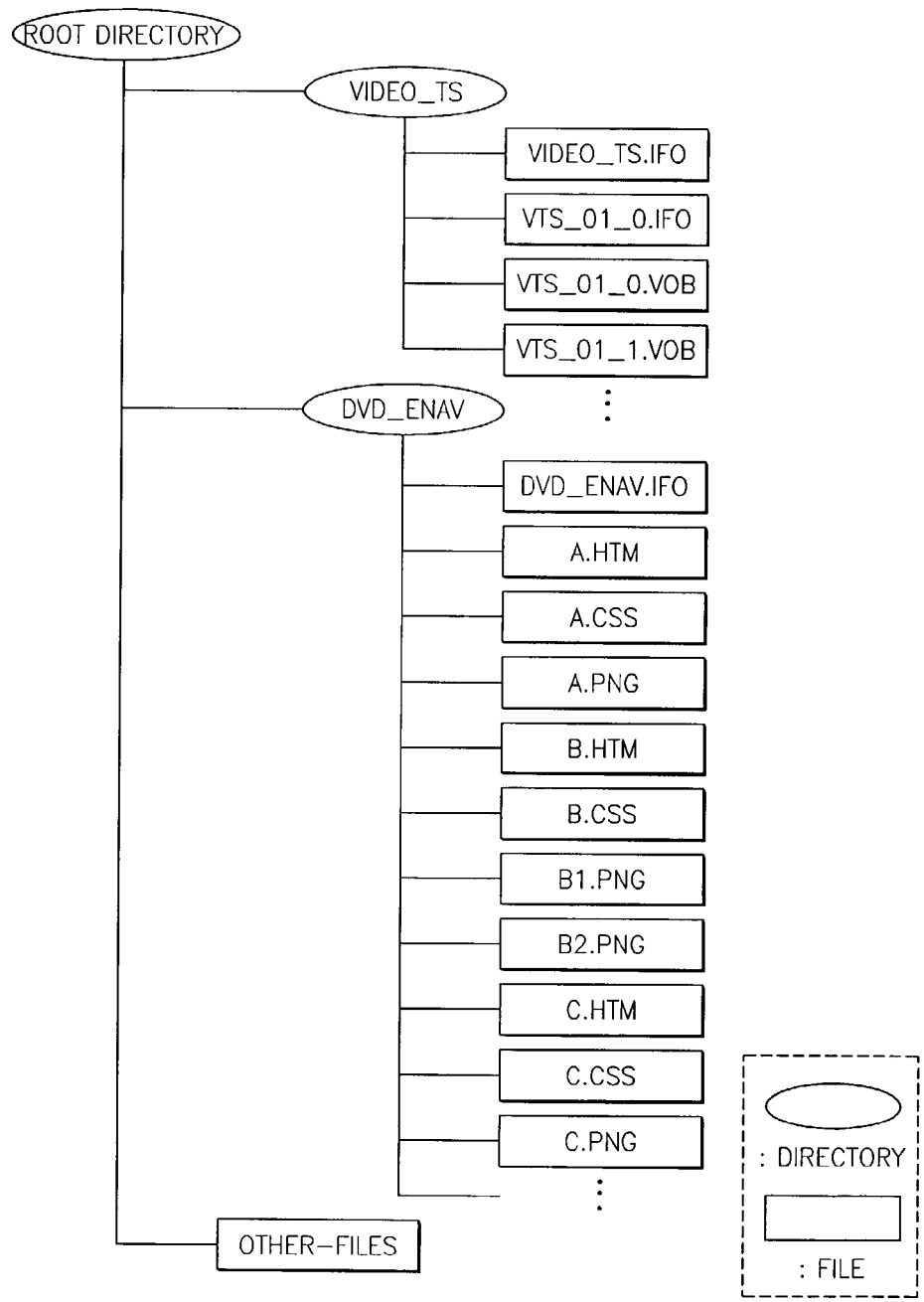
FIG. 3 shows the structures of files of the DVD 100 of FIG. 1 according to an aspect of the present invention.

FIG. 3 shows the structures of files of the DVD 100 of FIG. 1 according to an embodiment of the present invention. Referring to FIG. 3, a video directory VIDEO_TS includes AV data. An interactive directory DVD_ENAV includes data for supporting an interactive function, such as a markup document. The VIDEO_TS and DVD_ENAV directories are provided in a root directory. The AV data and the reproduction control information (also, known as navigation data) are recorded in the video directory VIDEO_TS. The reproduction control information includes information referred to so as to decode the AV data. The markup document and the scene synthesis information are recorded in the interactive directory DVD_ENAV.

More specifically, a file VIDEO_TS.IFO includes header information on the entire video title. The VIDEO_TS.IFO file is recorded in the video directory VIDEO_TS. A file VTS_01_0.IFO includes header information on a first video title. The VTS_01_0.IFO file is recorded in the video directory VIDEO_TS. Files VTS_01_0.VOB, VTS_01_1.VOB, . . . , which includes AV data for constructing the video title, are recorded in the video directory VIDEO_TS. A more detailed structure is disclosed in the DVD-Video standard "DVD-Video for Read Only Memory Disc 1.0," the disclosure of which is incorporated by reference.

A reproduction control information file DVD_ENAV.IFO includes header information on the entire data needed to support an interactive function. The DVD_ENAV.IFO file is recorded in the interactive directory DVD_ENAV. Only the DVD_ENAV.IFO file may be replaced with various meta tags of the markup document which performs a start up function. A markup document A.HTM is recorded in the interactive directory DVD_ENAV. A style sheet A.CSS, which includes scene synthesis information thereon, is recorded in the interactive directory DVD_ENAV. In addition, markup documents B.HTM and C.HTM and style sheets B.CSS and C.CSS corresponding to the markup documents B.HTM and C.HTM are recorded in the interactive directory DVD_ENAV. A.PNG, which is a graphic file to be inserted and displayed in the markup document A.HTM B1.PNG and B2.PNG are graphic files to be inserted and displayed in the markup document B.HTM, and C.PNG is a graphic file to be inserted and displayed in the markup document C.HTM. Graphics files A.PNG, B1.PNG, B2.PNG, C.PNG, are recorded in the interactive directory DVD_ENAV. Other markup documents and files having various shapes inserted and displayed therein may be recorded in the interactive directory DVD_ENAV.

Figure 4:
FIG. 4 shows a picture in picture (PIP) mode, as one display mode according to the present embodiment.

FIG. 4 shows a picture in picture (PIP) mode, as one display mode according to the present embodiment. Referring to FIG. 4, in the PIP mode, an AV scene is output as a PIP on a markup document scene. Only the markup document scene is physically placed in front of the AV scene, as described with reference to FIG. 2. The PIP mode enables the AV scene to seem to be output on the markup document scene from a user's viewpoint. Preferably, the PIP mode is subdivided by the placement location and size of the AV scene. In the shown embodiment, the PIP mode is divided into several shapes using PIP-#, such as PIP-1 and PIP-2. In the PIP mode, the user can change the location and size of the AV scene using a remote controller (not shown). Meanwhile, an example of an XML code for constructing the markup document A.HTM shown in FIG. 4 is as follows.

```
<?xml version="1.0"?>
<!DOCTYPE html
    PUBLIC "-//DVD//DTD XHTML DVD HTML 1.0//EN"
    "http://www.dvdforum/dvdenav/dvdhtml-1-0.dtd">
<html>
    <head>
        <title>DVD HTML PIP mode sample</title>
        <link rel="stylesheet" type="text/css" href="a.css">
    </head>
    <body onload="dvdvideo.play( );">
        <table border="0" width="720" height="480">
            <tr>
                <td>
                    <img src="a.png" width="100%"
                    height="100%" border="0"/>
                </td>
            </tr>
        </table>
    </body>
</html>
        A.HTM
```

It is apparent that the style sheet file A.CSS is linked to the above source code using a link tag. An example of a style sheet source code is as follows.

```
@screen-display
{
video-placement: pip
background-color: #00000000
viewport: rect(0px,719px,479px,0px)
window: rect(0px,719px,479px,0px)
video-viewport: rect(0px,719px,479px,0px)
}
    A.CSS
```

In the shown embodiment, a cascading style sheet (CSS) uses an @screen_display rule as above, so as to use a display mode between the markup document scene and the AV scene. Properties such as video-placement, which designates a display mode of the AV scene, background-color, which designates a background color of the AV scene, viewport, which designates a trimming area of a scene in which the AV scene is synthesized with the markup document scene, window, which designates a window of the scene in which the AV scene is synthesized with the markup document scene, and video-viewport, which designates an area to increase and reduce a desired portion of the AV scene, are described.

Figure 5:
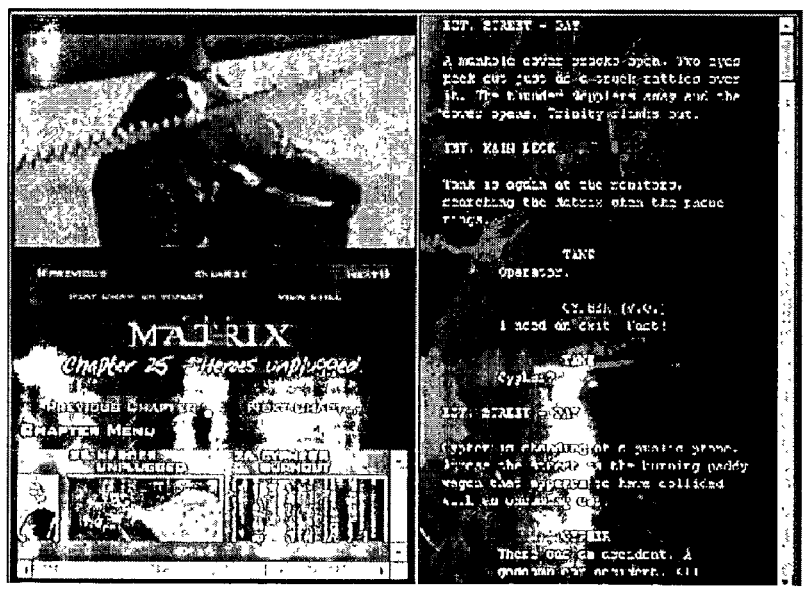
FIG. 5 shows an embedded mode, as one display mode according to the present embodiment.

FIG. 5 shows an embedded mode, as one display mode according to the present embodiment. Referring to FIG. 5, in the embedded mode, the AV scene is embedded in the markup document through <object . . . >. Thus, the location and size of the AV scene is moved and changed under the control of the markup document. In the embedded mode, the AV scene is embedded and displayed in a display window defined by the markup document. An example of an XML code for constructing the markup document B.HTM shown in FIG. 5 and an example of a style sheet source code are as follows.

```
<?xml version="1.0"?>
<!DOCTYPE html
    PUBLIC "-//DVD//DTD XHTML DVD HTML 1.0//EN"
    "http://www.dvdforum/dvdenav/dvdhtml-1-0.dtd">
<html>
    <head>
        <title>DVD HTML Embeded sample</title>
        <link rel="stylesheet" type="text/css" href="b.css">
    </head>
    <body onload="dvdvideo.play( ):">
        <table border="0" width="720" height="480">
            <tr>
                <td width="277" height="184" align="left" valign="top">
                    <object data="dvd:" width="277" height="184" border="0"/>
                </td>
                <td width="443" height="480" align="left" valign="top" rowspan="2">
                    <img src="b1.png" width="443" height="480" border="0"/>
                </td>
            </tr>
            <tr>
                <td width="277" height="296">
                    <img src="b2.png" width="277" height="296" border="0"/>
                </td>
            </tr>
        </table>
    </body>
</html>
B.HTM
@screen-display
{
video-placement: embedded
background-color: #00000000
viewport : rect(0px,719px,479px,0px)
window: rect(0px,719px,479px,0px)
video-viewport: rect(0px,719px,479px,0px)
}
B.CSS
```

A display window in which the AV scene is to be displayed using an object tag, is defined in B.HTM. That is, the area of the display window is determined by properties such as "width" and "height" in the "object" tag. In addition, it is apparent that a style sheet file B.CSS is linked to B.HTM using a link tag. Here, the B.CSS is a cascading style sheet (CSS) file for the B.HTM. CSS enables a "style" of the markup document to be described. Alternatively, the style sheet file can be linked to B.HTM using a style tag.

Figure 6:
FIG. 6 shows a background mode, as one display mode according to the present embodiment.

FIG. 6 shows a background mode, as one display mode according to the present embodiment. Referring to FIG. 6, in the background mode, the markup document scene is output on the AV scene. An example of an XML code for constructing the markup document C.HTM shown in FIG. 6 and an example of a style sheet source code are as follows. Similarly, a style sheet file C.CSS is linked to C.HTM using the link tag.

```
<?xml version="1.0"?>
<!DOCTYPE html
    PUBLIC "-//DVD//DTD XHTML DVD HTML 1.0//EN"
    "http://www.dvdforum/dvdenav/dvdhtml-1-0.dtd">
<html>
    <head>
        <title>DVD HTML Background sample</title>
        <link rel="stylesheet" type="text/css" href="c.css">
    </head>
    <body onload="dvdvideo.play( ):">
        <table id="mainscreen" border="0" width="720" height="480">
            <tr>
                <td width="388" height="300">
                    <p> </p>
                </td>
                <td width="322" height="300">
                    <p> </p>
                </td>
            </tr>
            <tr>
                <td width="388" height="180">
```

-continued

```
            <p> </p>
          </td>
          <td width="388" height="180">
            <div>
              <img src="c.png" width="319" height="100" border="0">
            </div>
        </tr>
      </table>
    </body>
</html>
C.HTM
@screen-display
{
video-placement: background
background-color: #00000000
viewport : rect(0px,719px,479px,0px)
window: rect(0px,719px,479px,0px)
video-viewport: rect(0px,719px,479px,0px)
}
body {background-color:transparent;}
table#mainscreen {background-color:transparent;}
C.CSS
```

Next, the properties and values used as the @screen-display rule representing a display mode between the markup document scene and the AV scene are as follows.

1. Video-Placement:

Video placement designates a display mode of the AV scene. The display modes include none, embedded, pip-#, and background representing nothing displayed, embedded mode, PIP mode, and background mode, respectively. An initial value is an embedded mode. Here, the background mode is discriminated from a background <body background="dvd:"> using a body tag. <body background="dvd:"> represents a background in a window defined to output the markup document scene. That is, in the background mode according to the present embodiment, the AV scene is displayed in the entire scene, but if the background using the body tag is designated, the AV scene is displayed only in a predetermined window scene.

2. Background-Color:

Background color designates a background color of a scene formed of a single color. A value is <color>, and an initial value may vary according to a user agent (UA).

3. Window:

Window designates a window in which a scene where the AV scene is synthesized with the markup document scene, is displayed. A value is <shape>, and an initial value is rect (0%, 100%, 100%, 0%).

4. Viewport:

Viewport designates a trimming area of the scene in which the AV scene is synthesized with the markup document scene. A value is <shape>, and an initial value is rect (0%, 100%, 100%, 0%).

5. Video-Viewport:

Video-viewport designates an area to increase and reduce a desired portion of the AV scene. A value is <shape>, and an initial value is rect (0%, 100%, 100%, 0%). Here, the value of the defined <shape> is rectangle (<top>,<right>, <bottom>,<left>).

FIGS. 7A through 7D show reference diagrams more specifically illustrating a display mode of the AV scene and the markup document scene according to video-viewport and video-placement. Referring to FIG. 7A, if an area a for increasing and reducing from the AV scene is designated by video-viewport, when video-placement is a background mode, a trimming area a is displayed in a background scene as shown in FIG. 7B, and a markup document scene (not shown) is displayed in the trimming area a. When video-placement is a PIP mode, the trimming area a is displayed in a designated location as shown in FIG. 7C. When video-placement is an embedded mode, the trimming area a is embedded in a display window defined by a markup document and is displayed in the display window as shown in FIG. 7D. FIGS. 7A through 7D show an example in which only a partial area of the AV data is selected, (i.e., the area of video-viewport is selected as a partial area) such that the partial area is mapped to the area of window defined by each display mode.

FIGS. 8A through 8C show reference diagrams more specifically illustrating a display mode of the AV scene and the markup document scene according to the viewport and the window. In the case of a property viewport selected to display a trimming area of contents of the scene in which the AV scene is synthesized with the markup document scene on a screen of a display, and a property window which designates a window area so that all or part of a selected document can be displayed in a predetermined scene area on a display screen, values for the viewport and the window are used without change. FIG. 8A shows an example illustrating that only a partial area b of the scene in which the AV scene is synthesized with the markup document scene is selected. Specifically, the area of video-viewport is selected as a partial area such that the partial area is mapped to the area of the window defined by each display mode. Thus, the concepts of viewport and window allow part or all of the scene in which the AV scene is synthesized with the markup document scene to be increased/reduced.

Referring to FIG. 8A, in the embedded mode in which the AV scene is embedded in the markup document scene and is displayed, a trimming area b of the scene in which the AV scene is synthesized with the markup document scene is designated by the viewport, the trimming area b is displayed in the window designated by window, as shown in FIG. 8B. When the entire markup document is set to viewport, the trimming area b is displayed in the window designated by the window, as shown in FIG. 8C. If a background using a body tag is designated, the entire synthesized scene is displayed in the window designated by window.

A property variable for designating a display mode, a property variable for designating a background color of an AV scene, a property variable for designating a window of a scene in which the AV scene is synthesized with a markup document scene, a property variable for designating a trimming area of the scene in which the AV scene is synthesized with the markup document scene, and a property variable for designating an area to increase and reduce a desired portion of the AV scene are defined in an object for controlling the above-mentioned CSS file.

In addition, the AV scene may be increased/reduced according to a user's input using an object source code of an application program interface (API) for a document object model (DOM). The value of the object source code needed in performing this operation can be referred to using a script language in the markup document.

The following object source code is used to bind "ScreenDisplayProperties" in root elements (i.e., <frameset> and <html>) of the uppermost level.

```
Interface ScreenDisplayProperties {
    attribute ScreenDisplayRule screenDisplayInfo;
}
```

Here, "ScreenDisplayProperties" are connected to root elements of the markup document, and the value of "ScreenDisplayProperties" can be referred to using a script language in the markup document. An example of the object source code is as follows.

```
IDL Definition
Interface ScreenDisplayRule
{
        attribute unsigned short   videoPlacement;
        attribute DOMString        colorBackground;
        attribute DOMString        viewport;
        attribute DOMString        window;
        attribute DomSting         videoViewport;
};
Attributes
videoPlacement: It designates a display mode of a DVD-video.
That is, it represents that
     const unsigned short VIDEO_PLACEMENT_NONE = 0;
     const unsigned short VIDEO_PLACEMENT_EMBEDDED = 1;
     const unsigned short VIDEO_PLACEMENT_BACKGROUND = 2;
     const unsigned short VIDEO_PLACEMENT_PIP = 3;.
colorBackground: It has the value of <color> as a background
color of an AV scene.
viewport: It has the value of <shape> as a trimming area of
a synthesized scene.
window: It has the value of <shape> as a window area on a display
to which the trimmed synthesized scene is to be mapped.
videoViewport: It has the value of <shape> as a trimming area of
the AV scene.
```

A static definition using a tag <meta> or <link> as well as a dynamic definition using the above object source are also possible.

Meanwhile, a script language included in the markup document is used to increase/reduce the output AV scene according to a user's input using the object source of the API for a DOM described above. The following example is an example in which a manufacturer can increase/reduce the AV scene displayed in an embedded state, as shown in FIG. 8.

```
<?xml version = "1.0" encoding="UTF-8"?>
<!DOCTYPE html PUBLIC "-//DVD//DTD XHTML DVD-HTML 1.0//EN"
              "http://www.dvdforum.org/envideo/dtd/dvdhtml-1.0.dtd">
<html>
    <head>
        <title>Example of Scaling</title>
        <script type=" text/ecmascript">
        <--
        function zoom(evt)
        {
        var vdi;
        if (evt == 0)
        { // evt == 0 : Increase an AV scene to a designated size
            vdi = document.documentElement.screenDisplayInfo;
            vdi.videoPlacement = 1;
            vdi.colorbackground = "black";
            vdi.videoviewport = "rect(10px,709px,469px, 10px)"
            // In an embedded state, vdi.window is determined by "width" and
"height" of a tag "Object" in a markup document. That is,
rect(0%, 100%, 100%,0%) is consistent with sizes of "width" and "height" defined
by the tag "Object".
        }
        if (evt == 1)
        { // evt == 1 : as original
            vdi = document.documentElement.screenDisplayInfo;
            vdi.videoPlacement = 1;
            vdi.colorbackground = "black";
            vdi.videoviewport = "rect(0px,719px,479px,0px)"
        }
        if (evt == 2)
        { // evt == 2 : Reduce an AV scene to a designated size
            vdi = document.documentElement.screenDisplayInfo;
            vdi.videoPlacement = 1;
            vdi.colorbackground = "black";
            vdi.videoviewport = "rect(0px,719px,479px,0px)"
            vdi.window="rect(10%,90%,90%, 10%)
```

-continued

```
            // Here, a % value is a relative value for "width" and "height" defined
by the tag "Object".
            }
         }
      }
      -->
      </script>
   </head>
   <body onload="dvdvideo.play( );">
   <table border="0" width="720" height="480">
      <tr>
         <td width="277" height="184" align="left" valign="top">
            <object data="dvd": width="277" height="184" border ="0"/>
         </td>
         <td width="443" height="480" align="left" valign="top" rowspan="2">
            <img src="b1.png" width="443" height="480" border="0"/>
         </td>
      </tr>
      <tr>
         <td width="277" height="296">
            <input type="button" value="Zoom-In" onClick="zoom(0)"/>
            <input type="button" value="Restore" onClick="zoom(1)"/>
            <input type="button" value="Zoom-Out" onClick="zoom(2)"/>
         </td>
      </tr>
   </table>
   </body>
</html>
```

In this way, the scale of the AV scene can be manipulated through a user's input using the API for a DOM and the script language.

Accordingly, the AV scene and the markup document scene are freely synthesized with each other according to the above-mentioned embodiment, and the display location of the AV scene can be set by a style sheet linked to the markup document or embedded in the markup document, thereby allowing a user to enjoy scenes in various shapes.

Figure 9:
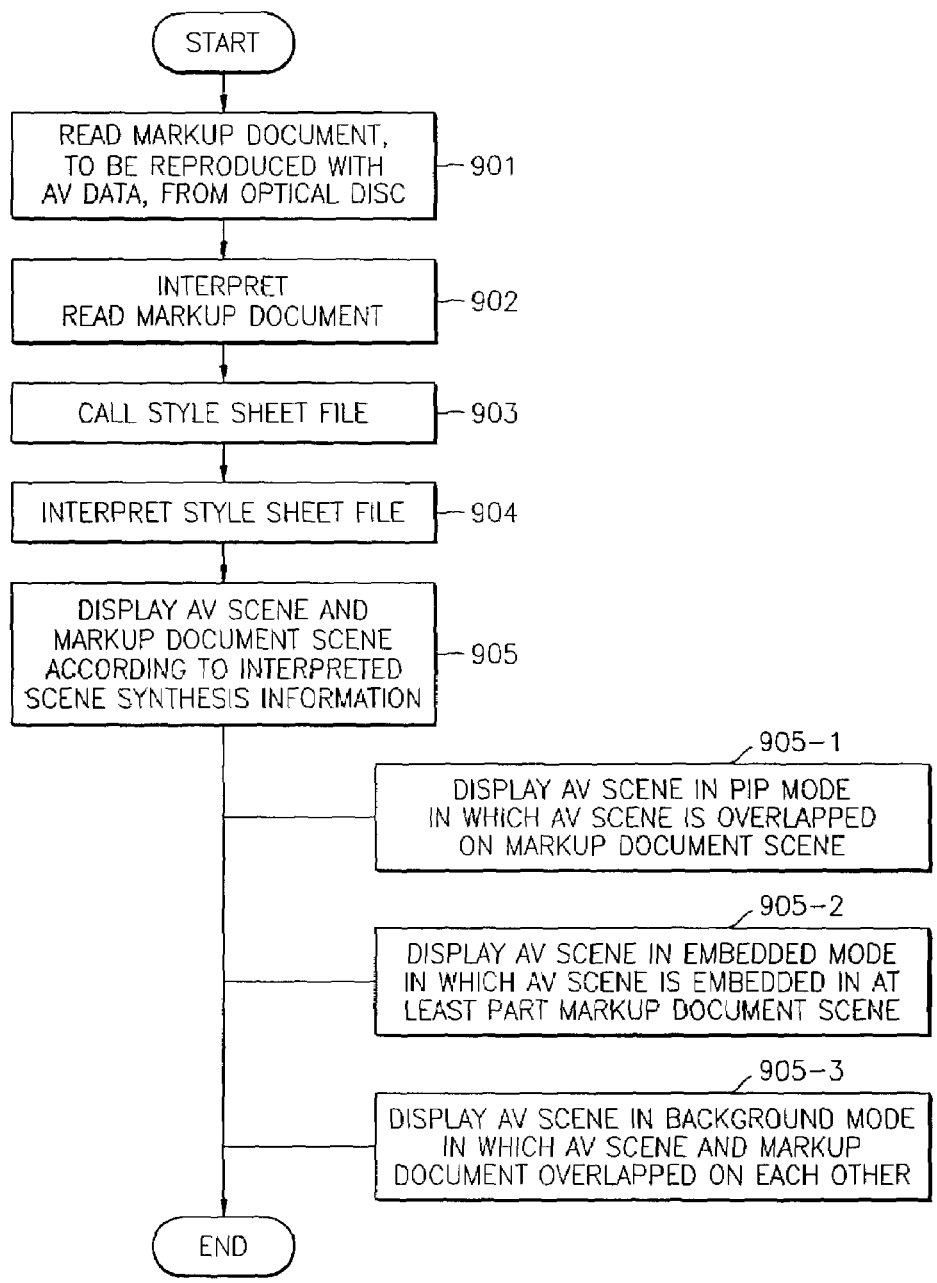
FIG. 9 is a flowchart illustrating an embodiment of a reproducing method according to the present invention.

A reproducing method according to the present invention will be described below based on the above structure. FIG. 9 shows a flowchart illustrating an embodiment of a reproducing method according to the present invention. The method shown in FIG. 9 can be implemented using computer software readable by a computer in a reproducing apparatus. Referring to FIG. 9, in operation 910, the reading unit 1 of the reproducing apparatus reads a markup document, which is to be reproduced with AV data, from the optical disc 100. The presentation engine 3 interprets the read markup document in operation 902 and calls a style sheet file linked to the markup document in operation 903. Subsequently, the presentation engine 3 interprets the style sheet file and provides the result of interpretation to the AV decoder 2 in operation 904. More specifically, the presentation engine 3 reads from the optical disc 100 display mode designation information, which designates a displaying mode of the AV scene described in the style sheet file, background color designation information, which designates a background color of the AV scene, window designation information, which designates a window in which a scene where the AV scene is synthesized with the markup document and is displayed on the screen of the display, trimming area designation information of the synthesized scene, which designates a trimming area of the scene in which the AV scene is synthesized with the markup document, and AV trimming area designation information, which designates an area to increase and reduce a desired portion of the AV scene. The AV decoder 2 decodes the AV data according to the style sheet file and outputs a corresponding AV scene to the blender 4. The presentation engine 3 outputs a command to display the markup document scene and the AV scene, and the markup document scene in which the markup document is reproduced, to the blender 4 according to the description in the style sheet file. For this purpose, the presentation engine 3 interprets a program, which is coded on the basis of an object having property variables for controlling the style sheet file and controls the style sheet file. The blender 4 blends and outputs the markup document and the AV scene, which are provided from the presentation engine 3 and the AV decoder 2, respectively.

In operation 905, the AV scene and the markup document scene are displayed according to interpreted scene synthesis information. In operation 905-1, when the PIP mode is described in the style sheet file, the AV scene is overlapped on the markup document scene and is displayed. In operation 905-2, when the embedded mode is described in the style sheet file, the AV scene is embedded in the markup document scene and is displayed. In operation 905-3, when the background mode is described in the style sheet file, the markup document scene is overlapped on the AV scene and is displayed.

Figure 10:
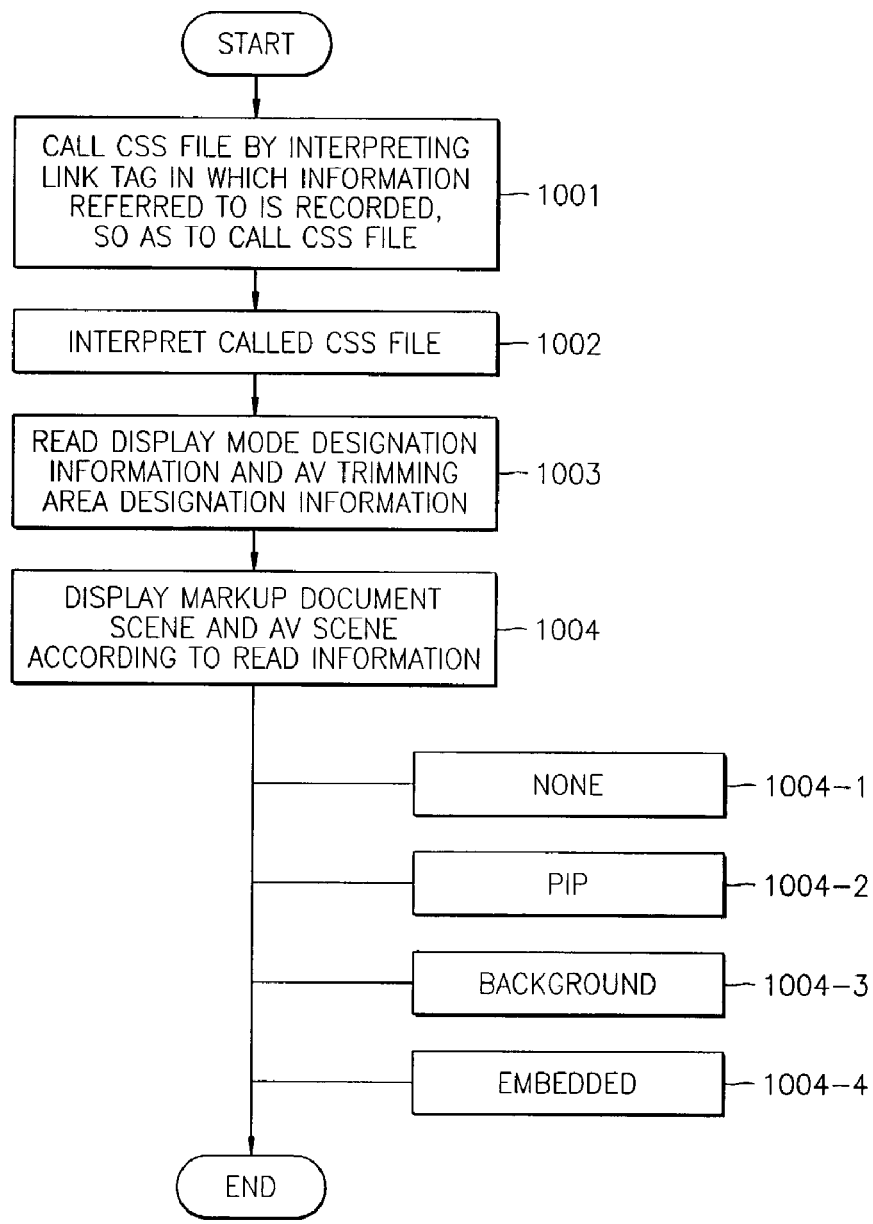
FIG. 10 is a flowchart specifically illustrating operations subsequent to operation 903 of FIG. 9.

FIG. 10 is a flowchart specifically illustrating operations subsequent to operation 903 of FIG. 9. Referring to FIG. 10, the presentation engine 3 interprets the CSS file in the markup document or the link tag, and calls the CSS file in operation 1001. The presentation engine 3 interprets the called CSS file in operation 1002, and reads the display mode designation information and the AV trimming area designation information, which are described in the CSS file, in operation 1003. The blender 4 blends and outputs the command and the markup document scene provided from the presentation engine 3 and the AV scene provided from the AV decoder 2. The markup document scene and the AV scene are displayed according to the display mode described in the CSS file in operation 1004. In the case of a none mode, the AV scene is not displayed in operation 1004-1. Otherwise, one of the PIP mode (operation 1004-2), the background mode (operation 1004-3), and the embedded mode (operation 1004-4) may be displayed.

Figure 11:
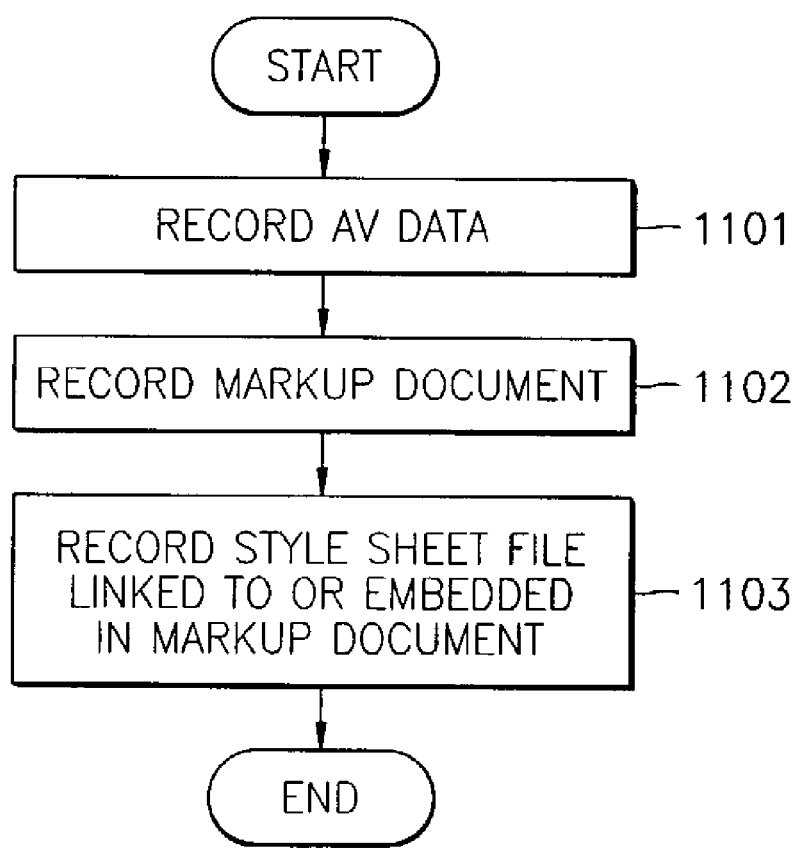
FIG. 11 is a flowchart illustrating an embodiment of a recording method according to the present invention.

FIG. 11 is a flowchart illustrating a preferred embodiment of a recording method according to the present invention. The method shown in FIG. 11 can be implemented by a computer program readable by a computer in a recording apparatus. Referring to FIG. 11, the recording apparatus records the AV data on an information storage medium (operation 1101), records the markup document that is to be reproduced with the AV data on the information storage medium (operation 1102), and records the above-mentioned scene synthesis information in the style sheet file linked to or embedded in the markup document (operation 1103). In operation 1103, an object having property variables for controlling the style sheet file in the markup document and a program for controlling the style sheet file on the basis of the object are recorded on the information storage medium.

Until now, there have been described embodiments in which the scene where the markup scene is synthesized with the AV scene is being increased/reduced using the properties window and viewport of the scene synthesis information, and part of the AV scene is increased/reduced using the property video-viewport such that the AV data and the markup document are displayed in various ways in the interactive mode.

Hereinafter, an embodiment of a method for displaying the AV data and the markup document in various ways in the interactive mode according to a resolution and an aspect ratio (screen ratio) set by the user or in the reproducing apparatus using the properties window and the viewport of the above-mentioned scene synthesis information will be described. When the markup document that is manufactured to have a fixed screen ratio in the present invention is displayed on a display having a different aspect ratio, a scene distortion phenomenon may occur by which part of data, such as text or graphics to be displayed on a display screen, is incorrectly displayed. Thus, in the present invention, the distortion of the scene is minimized to correspond to a screen mode (aspect ratio, resolution, and video output method) set by the user or already set in the reproducing apparatus by changing the interactive contents manufactured at one fixed screen ratio to have various screen ratios using the properties window and viewport.

First, methods for displaying interactive contents manufactured using a markup language in several displays having different screen aspect ratios while minimizing distortion of the interactive contents will be described with reference to FIGS. 12A through 12F. To meet the convenience of explanation, the ratio of pixel size in all cases is set to 1×1.

Figure 12A:
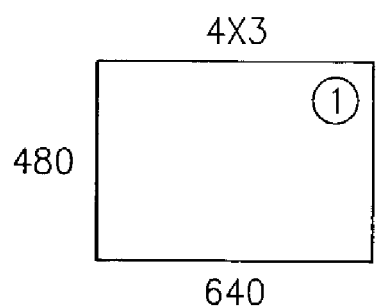
FIGS. 12A through 12F show a reference diagrams illustrating a method for displaying AV data and a markup document while minimizing a distortion of interactive contents in various displays having different screen ratios.
Figure 12B:
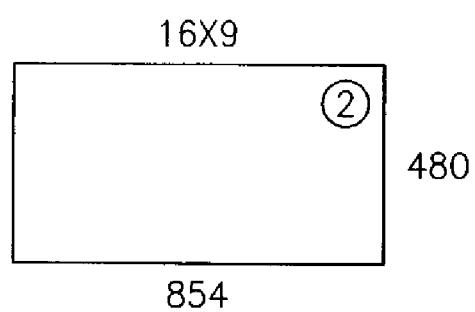
Figure 12C:
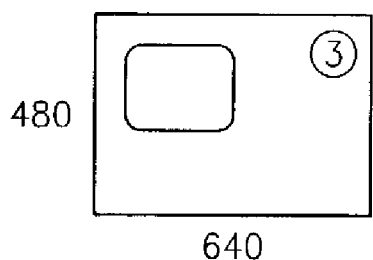
Figure 12D:
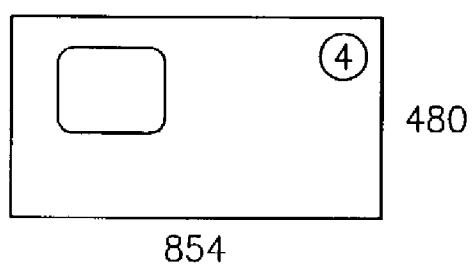
Figure 12E:
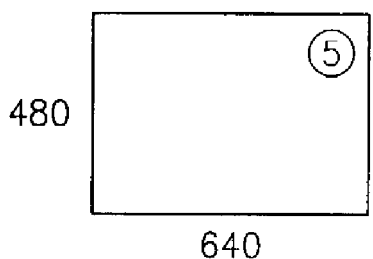
Figure 12F:
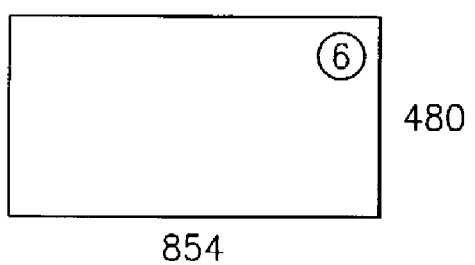

According to one displaying method, a manufacturer prepares respective markup documents and respective AV data by considering several screen aspect ratios so as to correspond to a display having different aspect ratios. In order to display interactive contents that are not distorted in the display having different aspect ratios as shown by FIG. 12A and FIG. 12B, the manufacturer prepares respective markup documents by considering different aspect ratios of the display as shown by FIG. 12C and FIG. 12D, and respective AV data (i.e., AV contents of DVD-video format) by considering different aspect ratios of the display as shown by FIG. 12E and FIG. 12F. Contents of FIGS. 12C through 12E, in which AV data for a 4×3 screen size is synthesized with a markup document for the 4×3 screen size, can be displayed on the screen of a display having the 4×3 screen size as shown by FIG. 12A. Contents of FIGS. 12D through 12F, in which AV data for the 16×9 screen size is synthesized with a markup document for the 16×9 screen size, can be displayed on the screen of a display having a 16×9 screen size as shown by FIG. 12B. This allows a display of the contents which the manufacturer wants without performing any special operation.

According to another displaying method, the manufacturer prepares the respective markup documents by considering aspect ratios of a display, and the AV data corresponds to a display having different aspect ratios in the following way when contents having a fixed aspect ratio are manufactured.

When only the screens shown in FIGS. 12C, 12D, and 12E are manufactured and when displaying on a display having the 4×3 screen size, the contents of FIGS. 12C through 12E, in which the AV data for the 4×3 screen size is synthesized with the markup document for the 4×3 screen size, can be displayed in a scene 1 shown in FIG. 12A. This allows a display of the contents which the manufacturer wants, without performing any special operation.

When displaying on a display having the 16×9 screen size, the AV data for the 4×3 screen size shown in FIG. 12E is embedded in the markup document for the 16×9 screen size shown in FIG. 12D, which includes right and left blanks without expansion. Only the right and left blanks may be eliminated by setting the size of an object tag of the markup document for the 16×9 screen size so that the AV data for the 4×3 screen size can be embedded in the markup document for the 16×9 screen size. The contents of FIGS. 12D and 12E can be displayed in a scene 2 shown in FIG. 12B as contents which the manufacturer wants without performing any special operation.

When only the screens shown in FIGS. 12C, 12D and 12F are manufactured, and when displaying on a display having the 4×3 screen size, the AV data 6 for the 16×9 screen size shown in FIG. 12F is converted into a shape of a 4×3 normal scene, 4×3 letter box scene, or 4×3 pan-and-scan scene and then is embedded in a markup document 3 for the 4×3 screen size shown in FIG. 12C. The manufactured contents of FIGS. 12C through 12F can be displayed in a scene 1 shown in FIG. 12A as contents which the manufacturer wants without performing any special operation.

Here, a full screen scene is referred to as a standard scene and is manufactured and reproduced at an aspect ratio of 4×3 (1.33:1). A full normal scene is displayed on a display having the 4×3 screen size. A black band appears at both ends of a screen of a display having the 16×9 screen size. If a user views a full scene on a display screen for 16×9 (wide mode of FIG. 13A), the resulting picture appears to be horizontally spread. If the user views the scene in a zoom mode, the upper and lower portions of the scene are cut off. In the two cases, the picture is simply increased and thus resolution is lower.

Pan-and-scan is a picture manufactured by cutting both sides of a picture manufactured in a wide scene format (16×9), and selecting only a middle portion of a scene corresponding to an aspect ratio of 4×3 (1.33:1) as shown in FIG. 13B, and a method for reproducing pan-and-scan is the same as that of a full screen.

A letter box scene has an advantage that the user can appreciate a scene as seen in a movie theater, but has a disadvantage that the size of the scene is reduced as shown in FIG. 13C. Thus, in a pan-and-scan method, both ends of an unimportant scene are cut off, and a picture is filled in a 4×3 scene rather than a scene is reduced and displayed. There may be a difference in picture beauty of the 4×3 pan-and-scan scene depending on an editor's skill.

Letter box is a picture manufactured by inserting a black band in upper and lower portions of a scene and reducing the scene so that the user can effectively view a picture manufactured in a wide scene format (16×9) in a normal display (screen ratio 4×3). The upper and lower black bands of the picture are referred to as "Matte."

When displaying on a display having the 16×9 screen size, the contents of FIGS. 12D and 12F, in which AV data for the 16×9 screen size is synthesized with a markup document for the 16×9 screen size, can be displayed in a scene 2 as shown in FIG. 12B as contents which the manufacturer wants, without performing any special operation.

According to a further displaying method, the manufacturer prepares the respective AV data by considering aspect ratios of a display, and a markup document corresponds to a display having different aspect ratios in the following way when contents having a fixed aspect ratio are manufactured.

When only the screens shown in FIGS. 12C, 12E and 12F are manufactured, and when displaying on a display having the 4×3 screen size, the contents of FIGS. 12C and 12E, in which the AV data for the 4×3 screen size is synthesized with a markup document for the 4×3 screen size, can be displayed in a scene 1 shown in FIG. 12A as contents which the manufacturer wants without performing any special operation.

When displaying on a display having the 16×9 screen size, the AV data 6 shown in FIG. 12F for the 16×9 screen size is converted into a shape of a 4×3 normal scene, 4×3 letter box scene, or 4×3 pan-and-scan scene and then is embedded in a markup document 3 shown in FIG. 12C for a 4×3 screen size. The manufactured contents of screens 3+6 shown in FIGS. 12C and 12F can be displayed to include blanks on the right and left sides of a scene 2 shown in FIG. 12B through middle alignment.

When only the screens shown in FIGS. 12D, 12E and 12F are manufactured and when displaying on a display having the 4×3 screen size, the AV data 5 for the 4×3 screen size shown in FIG. 12E is embedded in a markup document 4 shown in FIG. 12D for the 16×9 screen size to include right and left blanks without expansion. The resolution of the manufactured contents of FIGS. 12D and 12E is, for example, 854×480, and thus only an important screen portion can be displayed in a scene 1 of a display having a 4×3 screen size screen size shown in FIG. 12A through a concept of a "hot area" and an API with respect to aspect ratio conversion.

When displaying on a display having a 16×9 screen size, the contents of FIGS. 12D and 12F, in which AV data for the 16×9 screen size is synthesized with a markup document for the 16×9 screen size can be displayed in a scene 2 shown in FIG. 12B as the manufacturer wants without performing any special operation.

According to an additional displaying method, when each of AV data and a markup document is manufactured at one aspect ratio, the AV data and the markup document correspond to a display having different aspect ratios in the following way.

When only the screens 3, 5 shown in FIGS. 12C and 12E are manufactured, and when displaying on a display having the 4×3 screen size, the contents of FIGS. 12C and 12E in which AV data for the 4×3 screen size is synthesized with a markup document for the 4×3 screen size, can be displayed in the scene 1 shown in FIG. 12A as contents which the manufacturer wants without performing any special operation.

When displaying on a display having the 16×9 screen size, through the middle alignment of the entire contents of FIGS. 12C and 12E in which AV data for the 4×3 screen size is synthesized with a markup document for the 4×3 screen size, the contents of FIGS. 12C and 12E can be displayed to include blanks on the right and left sides of a screen of a display having the 16×9 screen size.

When only screens 4 and 6 shown in FIGS. 12D and 12F are manufactured and when displaying on a display having the 4×3 screen size, the resolution of the manufactured contents of FIGS. 12D and 12F, in which the AV data for the 16×9 screen size is synthesized with a markup document for the 16×9 screen size, is 854×480. Thus only an important screen portion can be displayed in a scene 1 shown in FIG. 12A of a display having the 4×3 screen size through a concept of "hot area" and an API with respect to aspect ratio conversion. In this case, preferably, the pan-and-scan or letter box is applied to the video mode other than the interactive mode.

When displaying on a display having the 16×9 screen size, the contents of FIGS. 12D and 12F, in which AV data is synthesized with a markup document can be displayed in a scene 2 shown in FIG. 12B as the manufacturer wants without performing any special operation.

Here, "hot area" and the API with respect to the aspect ratio conversion will be described in greater detail. When interactive contents manufactured for use in the 16×9 screen size (resolution of 854×480) are displayed on a display having the 4×3 screen size (resolution of 640×480), only a 640×480 area of the entire area of the interactive contents is displayed on the display having a 4×3 screen size. The remaining 214×480 area is not displayed on the display having a 4×3 screen size. Therefore, the manufacturer includes contents which should be displayed on a 640×480 area. As referred to in the present invention, the displayed maximum area is referred to as "hot area" regardless of an aspect ratio of a display. The 640×480 area is an area which can be displayed regardless of an aspect ratio of a display during initial layout, and includes unimportant contents or does not include any contents in the remaining area. In order to display a markup document manufactured by the concept of "hot area" on a display having the 4×3 screen size and in order to display an AV scene and a markup document scene in various ways, the interactive contents are displayed using the above-mentioned properties "viewport" and "window" used in the object source code of the API for a DOM, and descriptions thereof will be described later.

Hereinafter, a simple example in which interactive contents for the 16×9 screen size are displayed on a display having the 4×3 screen size regardless of an aspect ratio of a display, will be described with reference to FIG. 14. The manufacturer creates a markup document using the concept of "hot area" so as to display a scene that is not distorted regardless of the various aspect ratios of the display. That is, in a document space of a markup document shown in FIG. 14, the entire markup document is manufactured for 854×480 is to be displayed on a display with the 16×9 screen size. The contents of a 640×480 "hot area" is to be displayed on a display having the 4×3 screen size. Here, the size of the "hot area" is not fixed but is exemplified by a 640×480 size as a size for minimizing distortion, and its location is also not fixed.

In addition, in the markup document space manufactured for the 16×9 screen size, the manufacturer uses the property viewport so as to select the "hot area" that is set not to be distorted and is to be displayed on the display having the 4×3 screen size, maps to a designated are of a scene using the property window so as to display the selected "hot area" on the display having the 4×3 screen size.

Figure 15A:
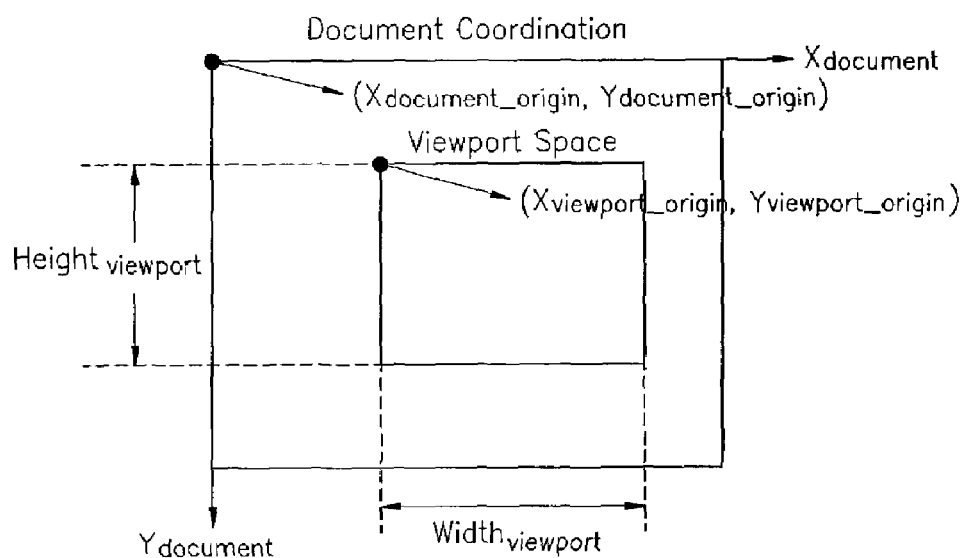
FIGS. 15A and 15B show variations in coordinate systems needed in mapping the area selected using the viewport to the area designated using the window.
Figure 15B:
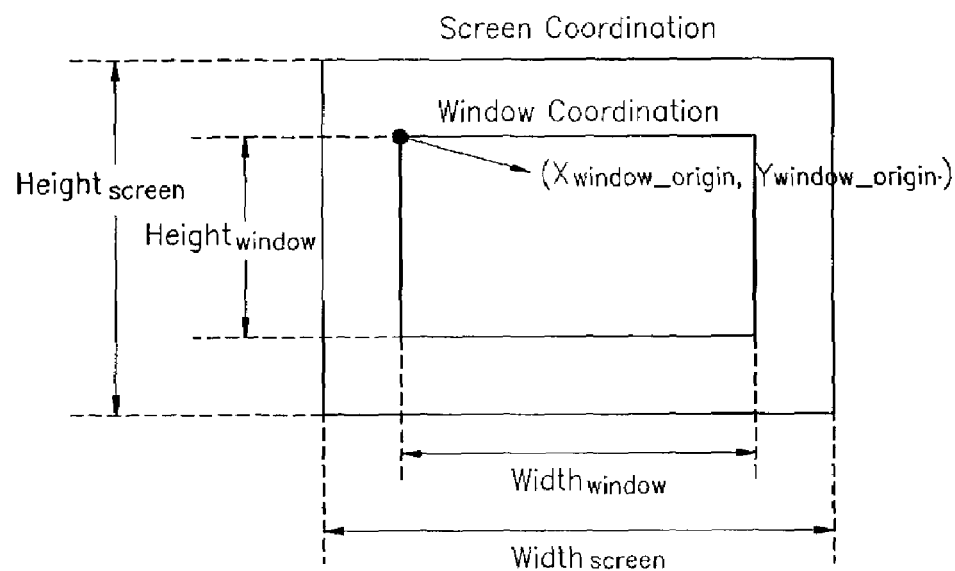

FIGS. 15A and 15B show variations in coordinate systems needed in mapping the area selected using viewport to the area designated using window.

$$X_{window} = \frac{(X_{document} - X_{viewport\_origin})}{Width_{viewport}} \times Width_{window} \quad (1)$$

$$Y_{window} = \frac{(Y_{document} - Y_{viewport\_origin})}{Width_{viewport}} \times Height_{window} \quad (2)$$

The above Equations 1 and 2 show that one point ($X_{document}$, $Y_{document}$) of a document coordinate system is mapped to one point ($X_{window}$, $Y_{window}$) of a corresponding window coordinate system.

$$X_{screen} = X_{window} + X_{window\_origin} \quad (3)$$

$$Y_{screen} = Y_{window} + Y_{window\_origin} \quad (4)$$

The above Equations 3 and 4 show that one point ($X_{window}$, $Y_{window}$) of a window coordinate system obtained by Equations 1 and 2 is mapped to one point ($X_{screen}$, $Y_{screen}$) of a corresponding screen coordinate system of a display. The above Equations 1 through 4 are based on a markup document, but if a lower subscript "document" is changed into "video," the definition of the AV data is made.

An example of an optimum table showing the size of each area through the above-mentioned displaying methods at a pixel size ratio of 1×1 to easily recognize a document area, a viewport area, a window area, and a screen area and the size of an area through other available displaying methods is as follows.

| Case | Document area | Viewport Area | Window area | Screen Area |
|---|---|---|---|---|
| When interactive contents manufactured for 640 × 480 are displayed on a 640 × 480 display | 640 × 480 | 640 × 480 | 640 × 480 | 640 × 480 |
| When interactive contents manufactured for 640 × 480 are displayed on a 854 × 480 display | 640 × 480 | 640 × 480 | 640 × 480 | 854 × 480 |
| When interactive contents manufactured for 640 × 480 are displayed on a 854 × 480 display | 640 × 480 | 640 × 480 | 854 × 480 | 854 × 480 |
| When interactive contents manufactured for 854 × 480 are displayed on a 640 × 480 display | 854 × 480 | 854 × 480 | 640 × 480 | 640 × 480 |
| When interactive contents manufactured for 854 × 480 are displayed on a 640 × 480 display | 854 × 480 | 854 × 480 | 640 × 480 | 640 × 480 |
| When interactive contents manufactured for 854 × 480 are displayed on a 640 × 480 display | 854 × 480 | 640 × 480 | 640 × 480 | 640 × 480 |
| When interactive contents manufactured for 854 × 480 are displayed on a 640 × 480 display | 854 × 480 | 854 × 480 | 854 × 480 | 854 × 480 |

Meanwhile, reproducing methods according to an aspect ratio are largely classified by a static method, which uses the CSS, and a dynamic method, which uses an API for a DOM. When interactive contents are initially displayed in a scene, the interactive contents are displayed on a display through a static method using a default style sheet in a presentation engine, or using a CSS defined by link and style tags in a markup document. However, when an aspect ratio is changed by a user's input during reproduction, the aspect ratio of an output screen can be dynamically changed by adding an aspect ratio conversion function using a script language to the markup document using the API for a DOM.

Hereinafter, a static method using the @screen-display rule will be described. A property screen-display type is added to the @screen-display rule according to another embodiment of the present invention.

1. Screen-Display Type:

Screen-display type designates the aspect ratio of a scene in which an AV scene is synthesized with a markup document.

4×3N: If a user sets a screen output to a 4×3 normal shape

4×3L: If a user sets a screen output to a 4×3 letter box shape

4×3P: If a user sets a screen output to a 4×3 pan-and-scan shape

16×9W: If a user sets a screen output to a 16×9 wide shape 2. video-placement:

Video-placement designates a display mode of the AV scene. The display modes include none, embedded, pip-#, and background representing nothing displayed, embedded mode, PIP mode, and background mode, respectively. An initial value is an embedded mode.

3. Video-Viewport:

Video-viewport designates an area to increase and reduce a desired portion of the AV scene. A value is <shape>, and an initial value is rect (0%, 100%, 100%, 0%). Here, the value of the defined <shape> is rectangle (<top>,<right>,<bottom>,<left>).

4. Background-Color:

Background-color designates a background color of a scene formed of a single color. A value is <color>, and an initial value may vary according to a user agent (UA).

5. Window:

Window designates a window in which a scene where the AV scene is synthesized with the markup document scene, is displayed. A value is <shape>, and an initial value is rect (0%, 100%, 100%, 0%).

6. Viewport:

Viewport designates a trimming area of the scene in which the AV scene is synthesized with the markup document scene. A value is <shape>, and an initial value is rect (0%, 100%, 100%, 0%).

```
@screen-display 4x3N
{
background-color : #000000
viewport : (0px,629px,479px,90px)
window : (0px,719px,479px,0px)
video-viewport : (0px,719px,479px,0px)
}
@screen-display 4x3L
{
background-color : #000000
viewport : (0px,719px,479px,0px)
window : (60px,719px,419px,0px)
video-viewport : (0px,719px,479px,0px)
}
@screen-display 4x3P
{
background-color : #000000
viewport : (0px,629px,479px,90px)
window : (0px,719px,479px,0px)
video-viewport : (0px,629px,479px,90px)
}
@screen-display 16x9W
{
background-color : #000000
viewport : (0px,719px,479px,0px)
```

*-continued*

```
    window : (0px,719px,479px,0px)
    video-viewport : (0px,719px,479px,0px)
}
```

Since the default style sheet is differently set in each reproducing apparatus, a scene cannot be usually displayed as the manufacturer wants. Thus, according to an aspect of the invention, the manufacturer uses another mechanism, such as an additional CSS, in the markup document and attaches the CSS to the document so that the user can effectively display the AV data (DVD-video) and the markup document manufactured at a fixed aspect ratio, even at an aspect ratio set by the user. The following example shows that the manufacturer makes the CSS in the markup document so that AV data (DVD-video) for the 16×9 screen size and a markup document for the 4×3 screen size can be effectively displayed in a "background mode." The CSS may be made using a "style" tag, as shown the following example, and may be used through external reference using a "link" tag.

```
<!DOCTYPE html PUBLIC "-//DVD//DTD XHTML DVD-HTML 1.0//EN"
        "http://www.dvdforum.org/enav/dtd/dvdhtml-1-0.dtd">
<html>
    <head>
        <title>Example of aspect ratio change</title>
        <style type="text/css">
            @screen-display 4x3N
            {
                video-placement : background
                background-color : #000000
                viewport : (0px,719px,479px,0px)
                window : (0px,719px,479px,0px)
                video-viewport : (0px,629px,479px,90px)//If the entire area is
selected using a viewport area, DVD-video displayed as a background seems to
be slim. Thus, in order to solve this problem, the manufacturer just selects pan
& scan. A selection area may be varied by the manufacturer.
            }
            @screen-display 4x3L
            {
                video-placement : background
                background-color : #000000
                viewport : (0px,719px,479px,0px)
                window : (60px,719px,419px,0px)
                video-viewport : (0px,719px,479px,0px)
            }
            @screen-display 4x3P
            {
                video-placement : background
                background-color : #000000
                viewport : (0px,719px,479px,0px)
                window : (0px,719px,479px,0px)
                video-viewport : (0px,629px,479px,90px) // An area formed by
cutting the right and left sides of DVD-video will be selected.
            }
            @screen-display 16x9W
            {
                video-placement : background
                background-color : #000000
                viewport : (0px,719px,479px,0px)
                window : (0px,629px,479px,90px) // In order to prevent a markup
document from distorting, a window area is reduced.
                video-viewport : (0px,719px,479px,0px)
            }
        </style>
    </head>
```

```
    <body id="bodyNode">
...................................................................................................................
    </body>
</html>
```

In this way, documents initially displayed by statically applying the CSS are displayed in a scene through the structure of processing shown in the following table in the presentation engine 3. A corresponding page of a document of which aspect ratio is changed during reproduction should be reloaded to guarantee a correctly displayed scene. If the corresponding page of the document is not reloaded and is displayed in the scene, the scene of the markup document may be distorted, or the markup document may be not mapped to the AV data.

```
If (Initial Display aspect ratio==4x3 && (no_video == 1
current display == nomal))
{
    apply@screen-display 4x3N
else if (Initial Display aspect ratio==4x3 && current display == 4x3P)
{
    apply@screen-display 4x3P
else if (Initial Display aspect ratio==4x3 && current display == 4x3L)
{
    apply@screen-display 4x3L
else if (Initial Display aspect ratio==16x9)
{
    apply@screen-display 16x9W
}
```

In the above algorithm in the presentation engine 3, "Initial Display aspect ratio" corresponds to Initial Display aspect ratio of a system parameter SPRM(14) defined in DVD Specifications for Read-Only Disc/Part 3. "Initial Display aspect ratio" is a parameter obtained by initially setting an aspect ratio which the user prefers and has the values of two types of screen sizes, such as the 4×3 and 16×9 screen sizes as shown in the above algorithm.

A "no_video" element indicates whether there is AV data (i.e., DVD-video) in a markup document loaded initially. In the shown example, if the value of "no_video" element is "0," it is determined that the DVD-video is included in the markup document. If the value of the "no_video" element is "1," it is determined that the DVD-video is not included in the markup document. "current display" is a parameter representing an output mode (normal, 4×3P, and 4×3L) of video in the current domain and is defined in SPRM(14) of DVD Specifications for Read-Only Disc/Part 3.

As above, the static method for displaying interactive contents according to a screen aspect ratio using the default style sheet or the CSS attached to the document by the manufacturer has been described.

The following object source code is used to bind "ScreenDisplayProperties" in root elements (i.e., <frameset> and <html>) of the uppermost level.

```
Interface ScreenDisplayProperties {
    attribute ScreenDisplayRule screenDisplayInfo;
};
```

ScreenDisplayProperties are connected to the root elements of the markup document. The value of ScreenDisplayProperties can be referred to using a script language in the markup document.

IDL Definition
Interface ScreeenDisplayRule
{
    readonly attribute unsigned short screenDisplayMode;
    attribute unsigned short videoPlacement;
    attribute DOMString    colorBackground;
    attribute DOMString    viewport;
    attribute DOMString    window;
    attribute DOMString    videoviewport;
};

Attributes screenDisplayMode: Aspect ratio of an output screen set by the user
    const unsigned short SCREEN_DISPLAY_MODE_4x3NORMAL = 0;
    const unsigned short SCREEN_DISPLAY_MODE_4x3LETTERBOX = 1;
    const unsigned short SCREEN_DISPLAY_MODE_4x3PAN&SCAN = 2;
    const unsigned short SCREEN_DISPLAY_MODE_16x9WIDE = 3;

videoPlacement: It designates a display mode of the AV scene
    const unsigned short VIDEO_PLACEMENT_NONE = 0;
    const unsigned short VIDEO_PLACEMENT_EMBEDDED = 1;
    const unsigned short VIDEO_PLACEMENT_BACKGROUND = 2;
    const unsigned short VIDEO_PLACEMENT_PIP = 3;

colorBackground: It has the value of <color> as a background color of an AV scene.

viewport: It has the value of <shape> as a trimming area of a markup document.

window: It has the value of <shape> as a window area on a display to which the trimmed markup document is to be mapped.

videoviewport: It has the value of <shape> as a trimming area of AV data.

The above-mentioned dynamic definition using the object source of the API for the DOM is implemented by a script language included in the markup document, as shown in the following example. The example is made by the manufacturer by considering event handling according to user's aspect ratio conversion of AV data for the 16×9 screen size (such as DVD-video) and a markup document for the 16×9 screen size which are to be displayed in an embedded mode.

```xml
<?xml version "1.0" encoding="UTF-8"?>
<!DOCTYPE html PUBLIC "-//DVD//DTD XHTML DVD-HTML 1.0//EN"
                http://www.dvdforum.org/envideo/dtd/dvdhtml-1-0.dtd">
<html>
    <head>
        <title>Example of aspect ratio change</title>
        <script type="text/javascript">
        <--
            function eventHandler(evt)
            {
            var vdi;
            if (evt.index == SCREEN_DISPLAY_MODE_CHANGE &&
(evt.param1 == 0))
                { // param1 == 0 : 4x3N
                    vdi = document.documentElement.screenDisplayInfo;
                    vdi.videoPlacement = 1;
                    vdi.colorBackground = "black";
                    vdi.viewport = "(0px,629px,479px,90px)"; // An area formed by
cutting right and left sides of a markup document is selected. In this case, it is
most preferable that the selected area is consistent with a "hot area".
                    vdi.window = "(0px,719px,479px,0px)";
                    vdi.videoviewport = "(0px,719px,479px,0px)"
                }
            if (evt.index == SCREEN_DISPLAY_MODE_CHANGE &&
(evt.param1 == 1))
                { // param1 == 1 : 4x3L
                    vdi = document.documentElement.screenDisplayInfo;
                    vdi.videoPlacement = 1;
                    vdi.colorBackground = "black";
                    vdi.viewport = "(0px,629px,479px,90px)";
                    vdi.window = "(0px,719px,479px,0px)";
                    vdi.videoviewport = "(0px,719px,479px,0px)" // Even though the
entire DVD-video picture is selected, in a 4 x 3 letter box mode, it seems that
"Matte" is added to the upper and lower portions of a scene.
                }
            if (evt.index == SCREEN_DISPLAY_MODE_CHANGE && (evt.param1
== 2))
                { // param1 == 2 : 4x3P
                    vdi = document.documentElement.screenDisplayInfo;
                    vdi.videoPlacement = 1;
                    vdi.colorBackground = "black";
                    vdi.viewport = "(0px,629px,479px,90px)";
                    vdi.window = "(0px,719px,479px,0px)";
                    vdi.videoviewport = "(0px,629px,479px,90px)" // Part of a scene
formed by cutting right and left sides of the DVD-video picture will be selected.
                }
            if (evt.index == SCREEN_DISPLAY_MODE_CHANGE && (evt.param1
== 3))
                { // param1 == 3 : 16x9W
                    vdi = document.documentElement.screenDisplayInfo;
                    vdi.videoPlacement = 1;
                    vdi.colorBackground = "black";
                    vdi.viewport = "(0px,719px,479px,0px)";
                    vdi.window = "(0px,719px,479px,0px)";
                }
            }
        -->
        </script>
        <script type="text/javascript">
        <--
            function setupEventHandler( )
            {
            //eventHandler is registered to bodyNode and Interactive Contents
            //SCREEN_DISPLAY_MODE_CHANGE == 500
            bodyNode.addEventListener("dvdvideo",eventHandler,true);
dvdVideo.SubscribeToEvent(SCREEN_DISPLAY_MODE_CHANGE,true);}
        -->
        </script>
    </head>
    <body id="bodyNode" onload="setupEventHandler( )">
    ................................................................................
    </body>
</html>
```

The markup document is displayed in a scene through initial static definition, and then due to the occurrence of an event according to a user's aspect ratio conversion key (or button) input, "vdi.screenDisplayMode" information is read, thereby reconstituting the aspect ratio of the scene using a script language included in the above markup document.

Figure 16:
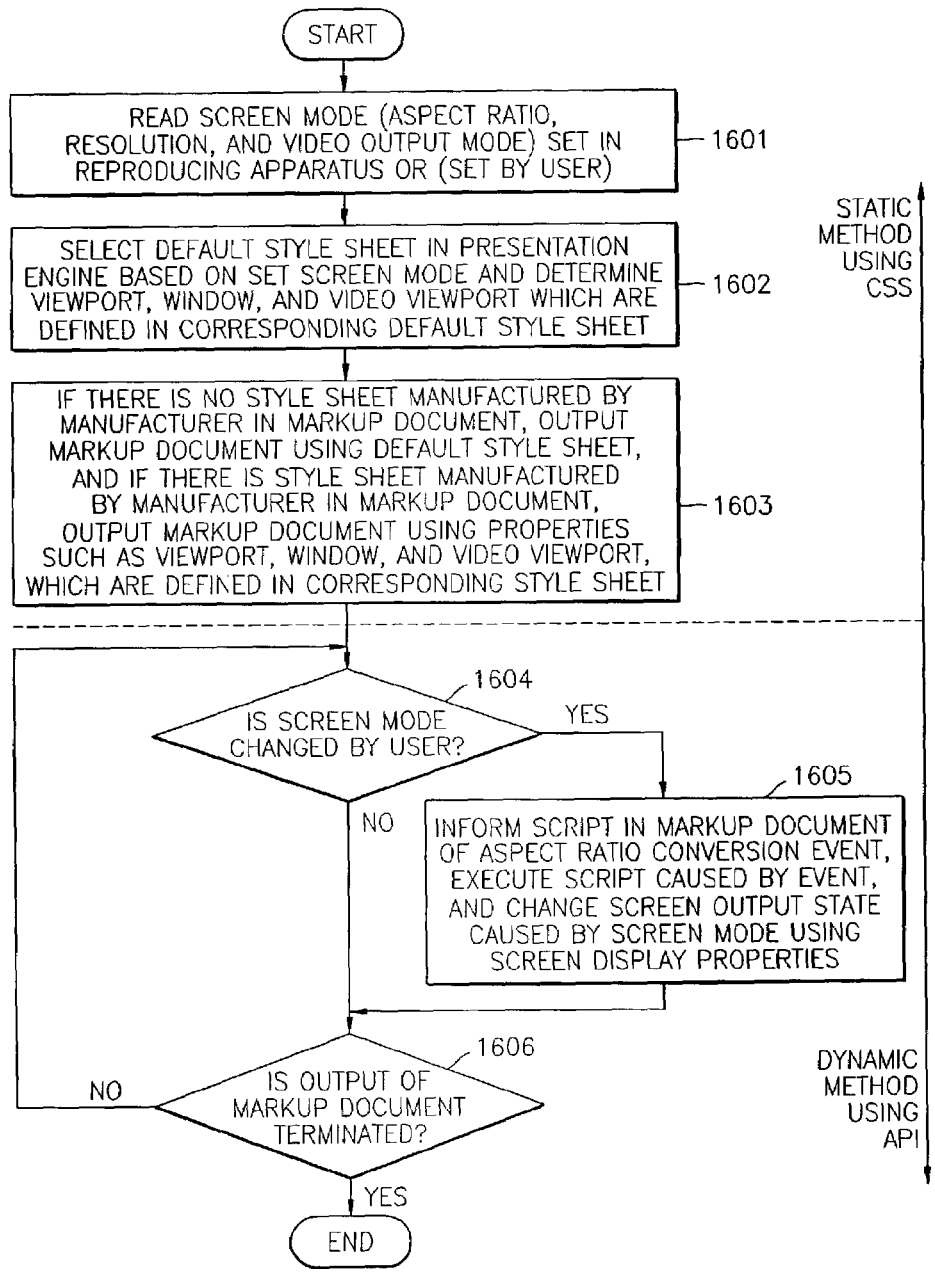
FIG. 16 is a flowchart of another embodiment of a reproducing method according to the present invention

FIG. 16 is a flowchart of another embodiment of a reproducing method according to the present invention. Referring to FIG. 16, by using the above-mentioned static and dynamic definitions, the markup document scene is displayed according to a screen mode (aspect ratio, resolution, and video output method) set by the user or set in the reproducing apparatus. The screen mode can be changed even during reproduction through a user's input. A viewport value and a window value of the markup document applied in this case can be applied to a next markup document as it is if these are not changed in a next markup document.

In operation 1601, the presentation engine 3 reads the screen mode (aspect ratio, resolution, and video output method) set in the reproducing apparatus or the screen mode set by the user. Here, a video output method is for a 16×9 video to be output in a 4×3 letter box or 4×3 pan-and-scan, and 16×9 wide mode, which can be displayed without scene distortion.

When a display is set to the 4×3 size, the AV decoder 2 converts an AV stream into a letter box or pan-and-scan shape and outputs the converted AV stream. When the display is set to the 16×9 size, the AV decoder 2 outputs the AV stream in the 16×9 size without conversion. This is because the AV stream is generally encoded in the 16×9 size in the DVD reproducing apparatus. However, it is preferable that the output is performed only when the AV stream is reproduced in a video mode other than a conventional interactive mode, and in the interactive mode, the AV stream is always output in the 16×9 size.

In operation 1602, a default style sheet in the presentation engine 3 is selected based on the set screen mode, and properties such as viewport, window, and video viewport, which are defined in the corresponding default style sheet, are determined. The presentation engine 3 interprets the markup document read by the reading unit 1 and checks the style sheet linked to or embedded in the markup document. In operation 1603, if there is no style sheet provided by the manufacturer in the markup document, the presentation engine 3 outputs the markup document to a scene using the properties such as viewport, window, and video viewport, which are defined in the default style sheet selected based on the set screen mode. If there is a style sheet provided by the manufacturer in the markup document, the presentation engine 3 outputs the markup document to the scene using the properties such as viewport, window, and video viewport according to the @screen-display which is defined in the corresponding style sheet.

In operation 1604, it is determined whether the screen mode according to a user's aspect ratio conversion key (or button) is changed. In operation 1605, if the screen mode is changed by the user, the presentation engine 3 informs the corresponding markup document of an aspect ratio conversion event ASPECT_RATIO_CHANGE, executes a script caused by the event, interprets a screen display property variable corresponding to the changed screen mode using ScreenDisplayProperties in the presentation engine 3, changes a screen output state of the markup document based on the interpreted information, and outputs a new markup document to the scene. In operation 1606, if the screen mode is not changed in operation 1604, it is determined whether the output of the markup document is terminated.

In the case of the markup document, a mode such as a letter box or pan-and-scan mode, has not been defined. Thus, if the markup document manufactured for a 16×9 size is displayed on a display having a 4×3 size, the method for effectively displaying the markup document using the concept of a "hot area," properties such as "viewport" and "window," have been described so as to prevent scene distortion where contents seem to be slim in another embodiment of the above-mentioned reproducing method according to the present invention.

In another embodiment of the reproducing method according to the present invention, a method is used that is highly effective in synthesizing an AV scene and a markup document, which are manufactured at a fixed aspect ratio (screen ratio) with each other without scene distortion, so that the user can enjoy a display state which is close to manufacturer's intention. Simultaneously, using the markup document having a fixed aspect ratio (screen ratio), a disc space can be more effectively used by avoiding repeated recording of interactive contents. When a storage medium which includes AV data (DVD-video), which is manufactured to a 16×9 size, and a markup document, which is manufactured to a 4×3 size, is to be displayed on a display having the 16×9 size using a reproducing apparatus, displaying methods according to displaying modes (embedded mode, background mode, and PIP mode) will be described with reference to FIGS. 17A through 17D.

FIG. 17B shows a case where AV data for the 16×9 size as shown in FIG. 17A is synthesized with a markup document in an "embedded mode." In the embedded mode, the AV data is embedded by "object" elements as shown in FIG. 17B as will be described. If the manufacturer sets "width" and "height" of the "object" tag in the markup document so that the AV data for the 16×9 screen is expressed as it is, the entire synthesized scene is selected as a viewport area and is not expanded so that there is no scene distortion in a display having the 16×9 size. Further, an area excluding right and left blanks is selected as a window area, and the synthesized scene is displayed, thereby the scene can be effectively displayed. However, if the manufacturer sets "width" and "height" of the "object" tag used to embed the AV data for the 16×9 size to a 4×3 screen ratio, the AV data will be embedded in the markup document in a normal shape, letter box or pan-and-scan shape, and the synthesized scene will be displayed on the display having a 16×9 screen size without expansion. In this case, even though the AV data is manufactured to a 16×9 size, the AV data is embedded in the display having a 16×9 screen size at the 4×3 screen ratio, and thus this case is not considered as preferable.

FIG. 17C shows a case where the AV data is synthesized with the markup document in a "background" mode using the property video-placement in the @screen-display of a cascading style sheet (CSS). In the above-mentioned another embodiment of the reproducing method according to the present invention, the viewport area has both the AV data and the markup document, but the window area has been defined only in the synthesized scene thereof. Thus, if the synthesized scene in the "background" mode is displayed on the display having the 16×9 size, the AV data displayed as the background is just displayed at the same 4×3 screen ratio as an aspect ratio of the markup document.

FIG. 17D shows a case where the AV data is synthesized with the markup document in a "PIP" mode using the property video-placement in the @screen-display of a cascading style sheet (CSS). This case is similar to the shape of the embedded mode, and an original markup document will make a total scene for the 4×3 size without considering the AV data. The markup document is displayed in a scene, and then the AV data under a graphic plane will be displayed in a transparent handling area set for each PIP-# in the presentation engine 3. In this case, the reduced AV data under the transparent handling area appears in a predetermined area for each PIP-#, and thus adaptability is lower.

Figure 18A:
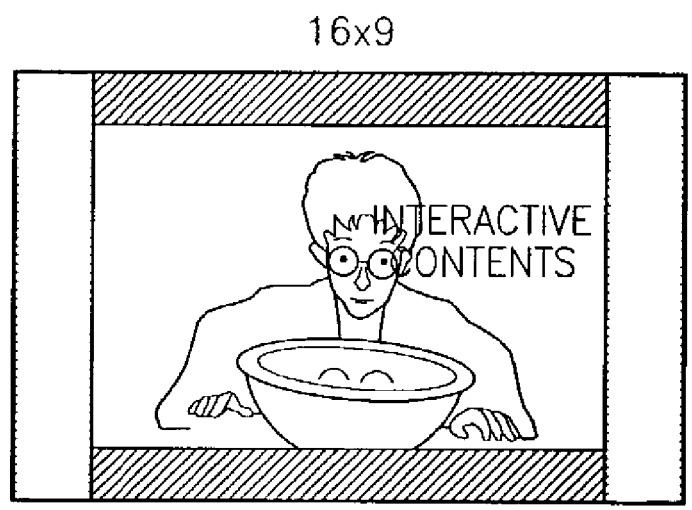
FIGS. 18A and 18B show reference diagrams in which the AV data for 16×9 is synthesized with the markup document for 4×3 in a background mode, and then is displayed on a display having a 16×9 screen size.
Figure 18B:
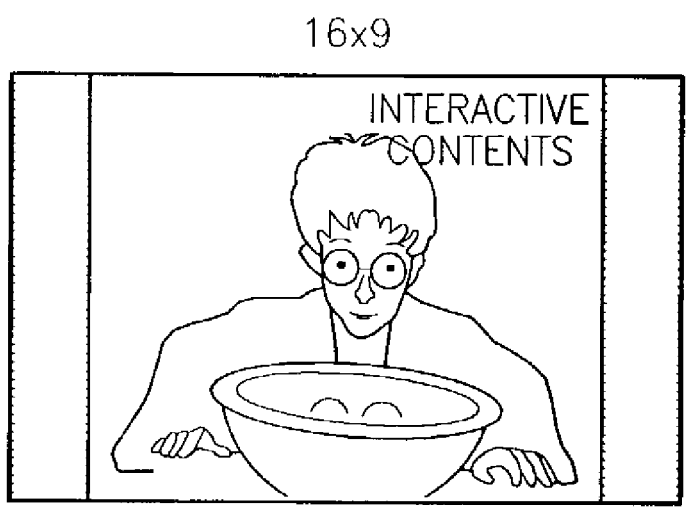

Since the area set to the viewport in a scene in which the markup document is synthesized with the AV data is mapped to window for designating an area so that corresponding interactive contents are displayed on the display, in particular, in the "background" mode among various reproduction modes, the scene cannot be produced as the manufacturer wants. That is, FIG. 18A shows a case where the AV data for the 16×9 size is synthesized with a markup document for the 4×3 size in a letter box shape in the "background" mode and is displayed on a display having a 16×9 aspect ratio. In addition, FIG. 18B shows a case where the AV data for the 16×9 size is synthesized with the markup document for the 4×3 size in a pan-and-scan shape in the "background" mode and is displayed on the display having the 16×9 aspect ratio. Since only the window area of the synthesized scene is defined when displaying the scene even though the manufacturer encodes the AV data to a 16×9 size, in order to prevent the AV data from displaying in the letter box or pan-and-scan shape as shown in FIGS. 18A and 18B, in another embodiment of the present invention, a scene can be displayed in the most appropriate shape according to an aspect ratio of a display or display modes (embedded mode, background mode, and PIP mode) by defining the viewport and window properties only for a markup document and the viewport and window properties only for AV data, respectively.

Figure 19A:
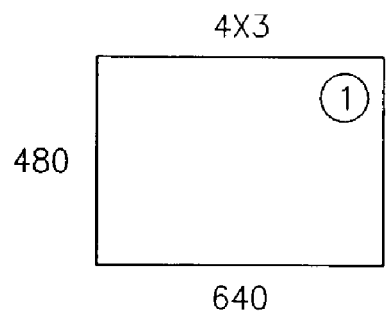
FIGS. 19A through 19F show reference diagrams illustrating a display, a markup document, and AV data according to different aspect ratios.
Figure 19B:
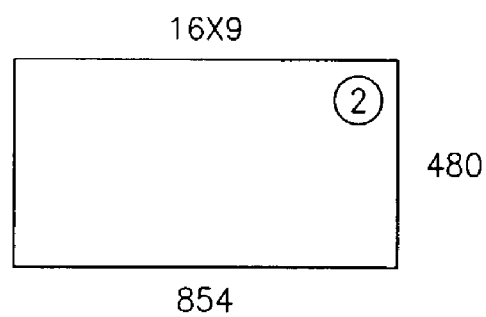
Figure 19C:
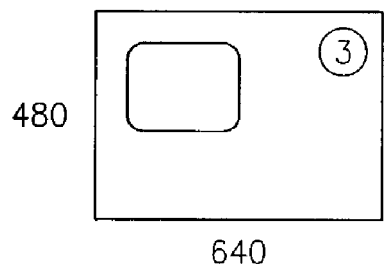
Figure 19D:
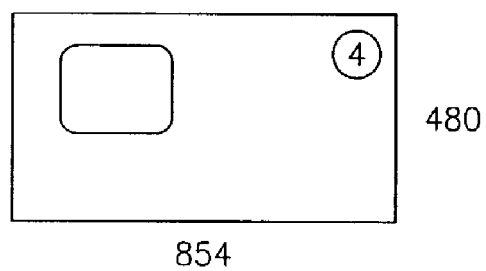
Figure 19E:
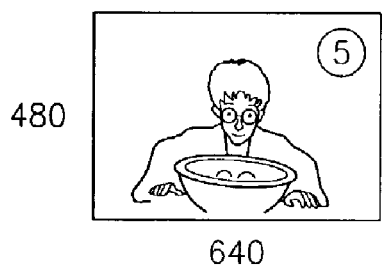
Figure 19F:
Figure 20A:
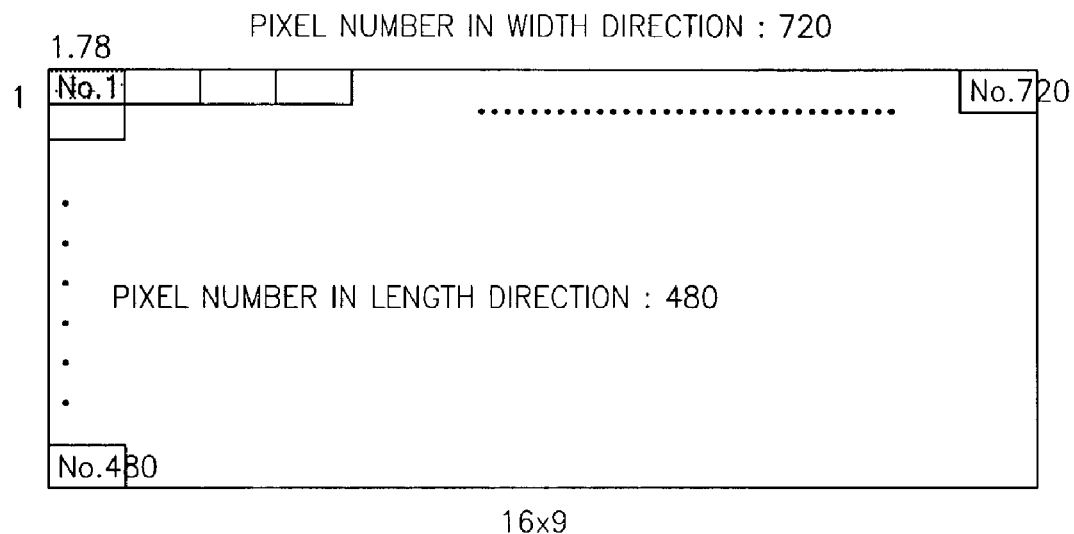
FIGS. 20A and 20B show reference diagrams illustrating the ratio of width to length in pixels in a display having a 16×9 screen size and the ratio of width to length in pixels in a display having a 4×3 screen size.
Figure 20B:
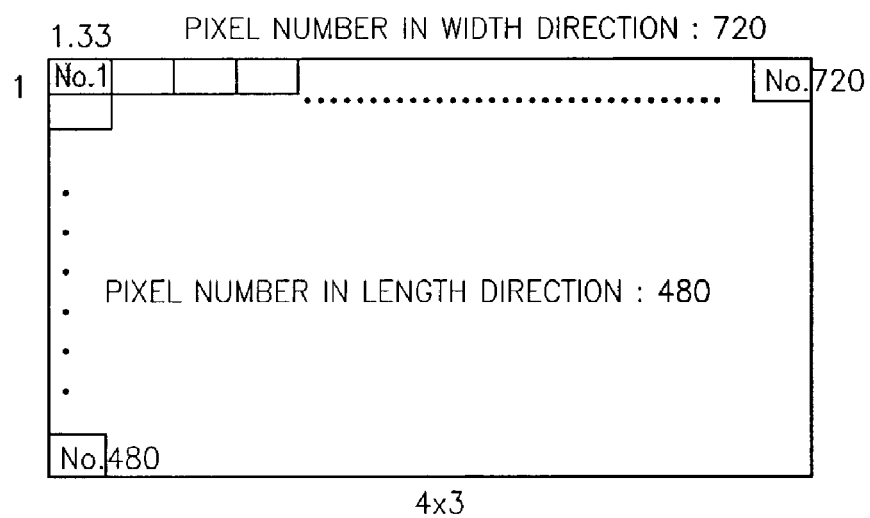

In FIGS. 19A through 19F, assuming that the markup documents considering different aspect ratios of displays 3 and 4 shown in FIGS. 19C and 19D, and AV data (i.e., AV contents of DVD-video format) considering different aspect ratios of displays 5 and 6 shown in FIGS. 19E and 19F exist in displays 1 and 2 shown in FIGS. 19A and 19B for 4×3 and 16×9 screen sizes. A resolution of the displays is 720×480 having the same pixel number, as shown in FIGS. 20A and 20B, in the case of NTSC. Only, in a 16×9 aspect ratio, the ratio of width to length of a pixel is 1.78:1, as shown in FIG. 20A, and in a 4×3 aspect ratio, the ratio of width to length of a pixel is 1.33:1 as shown in FIG. 20B.

Figure 21:
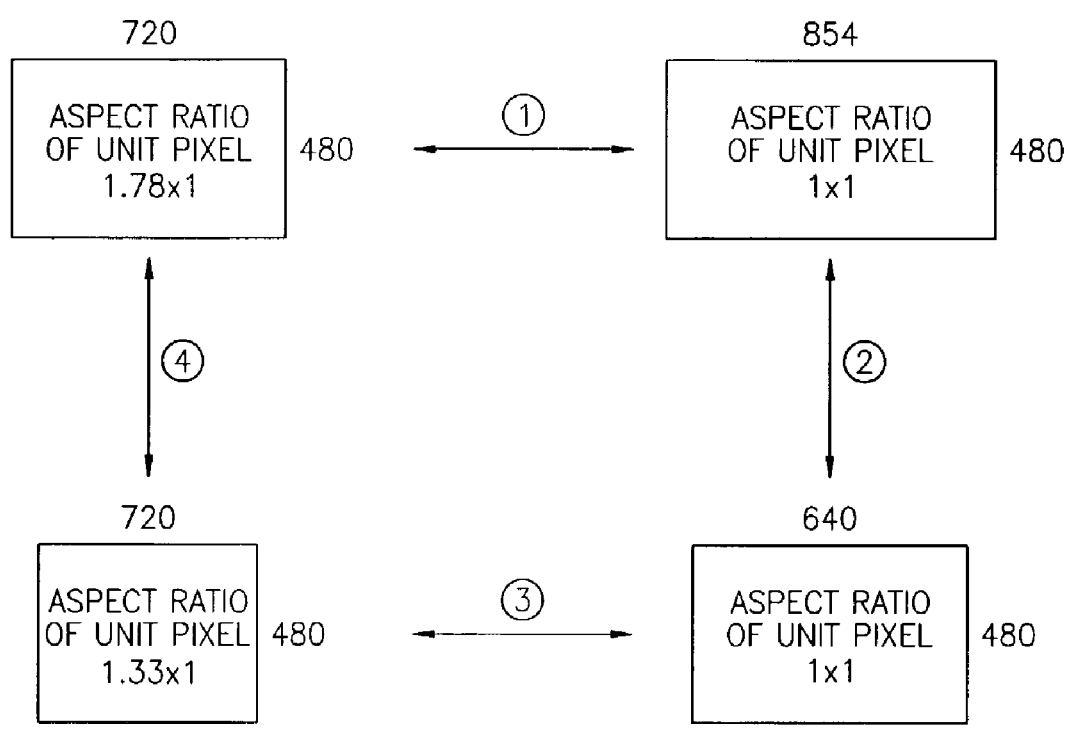
FIG. 21 shows a reference diagram illustrating various aspect ratio conversions.

In this way, if a display is a television (TV), the aspect ratio of a scene pixel varies according to the type of TV, and thus it is difficult to understand variations in a scene. Thus, for the convenience of explanation, a conversion equation with regard to each case of 1.78×1, 1.33×1, and 1×1 screen ratios will be described with reference to FIG. 21. Only, the length of a unit pixel is the same. Namely, in all cases, there are no variations in height.

Conversion 1: The resolution of 720×480 having a 16×9 pixel aspect ratio is converted into a shape having a 1×1 unit pixel aspect ratio. Total horizontal resolution=normalization (when the length ratio of the unit pixel is 1, a width ratio, total vertical resolution)=when the length ratio of the unit pixel is 1, a width ratio×total horizontal resolution=1.78× 480=854.

Therefore, the resolution of a 720×480 size having a 16×9 pixel aspect ratio is consistent with the resolution of a 854×480 size having a 1×1 unit pixel aspect ratio. That is, when converting into a shape using conversion 1, the following Equation is formed:

$$X(1.78:1) = \frac{720}{854} X(1:1)$$

$$X(1:1) = \frac{854}{720} X(1.78:1)$$

Conversion 2: Conversion between the resolution of 854× 480 and 640×480 having a 1×1 unit pixel aspect ratio. In the case of interactive contents manufactured to a 854×480 size, all contents cannot be displayed on a 640×480 display, and thus only an area (corresponding to "hot area") corresponding to a 640×480 size are selected using viewport and displayed on the 640×480 display. When interactive contents manufactured to a 640×480 size are displayed on a 854×480 display, all contents are displayed in a 640×480 area, and the other 214×480 area is filled with a background color. That is, when the interactive contents of 854×480 are displayed on the 640×480 display, the viewport are of the interactive contents needs to be well selected. When the interactive contents of a 640×480 size are displayed on the 854×480 display, the window area of the display needs to be well selected.

Conversion 3: The resolution of 720×480 having a 4×3 pixel aspect ratio is converted into a shape having a 1×1 unit pixel aspect ratio. Total horizontal resolution=normalization (when the length ratio of the unit pixel is 1, a width ratio, total vertical resolution)=when the length ratio of the unit pixel is 1, a width ratio×total horizontal resolution=1.33× 480=around 640.

Therefore, the resolution of a 720×480 size having a 4×3 pixel aspect ratio is consistent with the resolution of a 640×480 size having a 1×1 unit pixel aspect ratio. That is, when converting into a shape using conversion 3, the following Equation is formed:

$$X(1.33:1) = \frac{720}{640} X(1:1)$$

$$X(1:1) = \frac{640}{720} X(1.33:1)$$

Conversion 4: Conversion between the resolution of a 720×480 size having a 16×9 pixel aspect ratio and the resolution of 720×480 having a 4×3 pixel aspect ratio. The following Equation is formed between the horizontal resolution having the 4×3 (12×9) pixel aspect ratio and the horizontal resolution having the 16×9 pixel aspect ratio.

$$X(1.78:1) = \frac{12}{16} X(1.33:1)$$

$$X(1.33:1) = \frac{16}{12} X(1.78:1)$$

That is, it is most appropriate that the 720×480 resolution in the display having a 4×3 screen size is displayed in 540×480 resolution in the display having the 16×9 size, and thus when only an area (corresponding to the "hot area") corresponding to 540×480 in the interactive contents for 16×9 is selected, the selected area is correctly displayed on the display having a 4×3 screen size.

Meanwhile, if the 720×480 resolution having the 16×9 pixel aspect ratio is converted into a letter box shape in the 720×480 resolution having the 4×3 pixel aspect ratio, a vertical resolution is varied. Thus, the following Equation is formed between the vertical resolution having the 4×3 (16×12) pixel aspect ratio and the vertical resolution having the 16×9 pixel aspect ratio.

$$Y(1.33:1) = \frac{9}{12} Y(1.78:1)$$

$$Y(1.78:1) = \frac{12}{9} Y(1.33:1)$$

That is, the size of the window area in the display having the 4×3 size should be 720×360 so that the 720×480 resolution for the 16×9 size is maintained at a 16×9 size and is displayed on the display having the 4×3 size.

As above, when the AV data and the markup document are manufactured by the manufacturer at one aspect ratio on the basis of conversion methods performed in a case where the ratio of a unit pixel size is different, their contents are displayed according to aspect ratios of the displays, as shown in the following table.

For reference, in the following table, the size of a pixel in each case is set to 1×1 on the basis of the above-mentioned conversion relation. Thus, it is assumed the resolution having the 4×3 aspect ratio to 640×480, and the resolution having the 16×9 aspect ratio to 854×480. In addition, in the embedded mode or PIP mode, it is assumed that AV data for the 4×3 size is displayed in an area of 200×150, and AV data for the 16×9 size is displayed in an area of 272×153.

| Contents manufactured | Display | Reproduction mode | Viewport size Markup document | Viewport size AV data | Window size Markup Document | Window size AV data |
|---|---|---|---|---|---|---|
| 4 × 3 markup document, 4 × 3 AV data | 4 × 3 | Embedded mode | 640 × 480 | 640 × 480 | 640 × 480 | determined by object tag |
| | | Background Mode | 640 × 480 | 640 × 480 | 640 × 480 | 640 × 480 |
| | | PIP mode | 640 × 480 | 640 × 480 | 640 × 480 | 200 × 150 |
| | 16 × 9 | Embedded mode | 640 × 480 | 640 × 480 | 640 × 480 | determined by object tag |
| | | Background mode | 640 × 480 | 640 × 480 | 640 × 480 | 640 × 480 |
| | | PIP mode | 640 × 480 | 640 × 480 | 640 × 480 | 200 × 150 |
| 4 × 3 markup document, 16 × 9 AV data | 4 × 3 | Embedded Mode | 640 × 480 | 854 × 480 | 640 × 480 | determined by object tag |
| | | Background mode | 640 × 480 | 640 × 480 (P) | 640 × 480 | 640 × 480 |
| | | PIP mode | 640 × 480 | 854 × 480 | 640 × 480 | 200 × 150 |
| | 16 × 9 | Embedded mode | 640 × 480 | 854 × 480 | 640 × 480 | determined by object tag |
| | | Background mode | 640 × 480 | 854 × 480 | 640 × 480 | 854 × 480 |
| | | PIP mode | 640 × 480 | 854 × 480 | 640 × 480 | 272 × 153 |
| 16 × 9 markup document, 4 × 3 AV data | 4 × 3 | Embedded mode | 640 × 480 | 640 × 480 | 640 × 480 | determined by object tag |
| | | Background mode | 640 × 480 | 640 × 480 | 640 × 480 | 640 × 480 |
| | | PIP mode | 640 × 480 | 640 × 480 | 640 × 480 | 200 × 150 |
| | 16 × 9 | Embedded mode | 854 × 480 | 640 × 480 | 854 × 480 | determined by object tag |
| | | Background mode | 854 × 480 | 640 × 480 | 854 × 480 | 640 × 480 |
| | | PIP mode | 640 × 480 | 640 × 480 | 854 × 480 | 200 × 150 |
| 16 × 9 markup document, 16 × 9 AV data | 4 × 3 | Embedded mode | 640 × 480 | 854 × 480 | 640 × 480 | determined by object tag |
| | | Background mode | 640 × 480 | 640 × 480 (P) | 640 × 480 | 640 × 480 |
| | | PIP mode | 640 × 480 | 854 × 480 | 640 × 480 | 200 × 150 |
| | 16 × 9 | Embedded mode | 854 × 480 | 854 × 480 | 854 × 480 | determined by object tag |
| | | Background mode | 854 × 480 | 854 × 480 | 854 × 480 | 854 × 480 |
| | | PIP mode | 854 × 480 | 854 × 480 | 854 × 480 | 272 × 153 |

In the above table, (P) indicates a pan-and-scan shape.

Figure 22A:
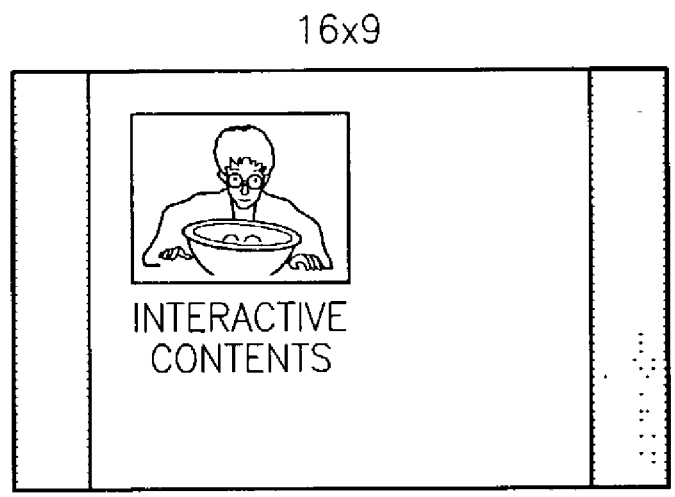
FIGS. 22A through 22C show reference diagrams in which AV data for 16×9 and a markup document for 4×3 each having a window area are synthesized with each other, and then is displayed on a display having a 16×9 screen size.
Figure 22B:
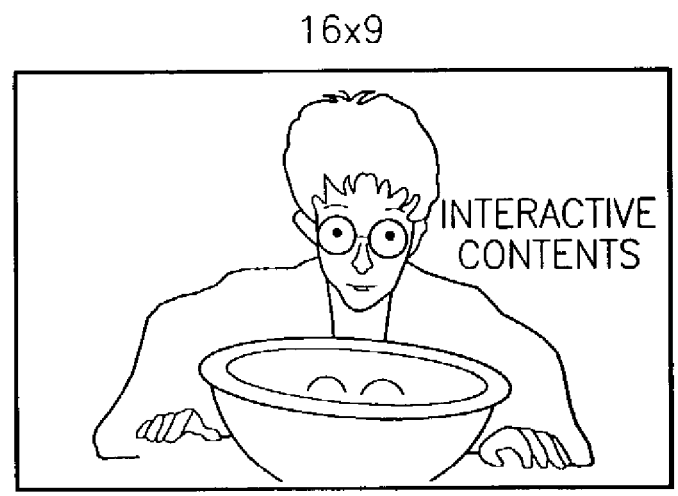
Figure 22C:
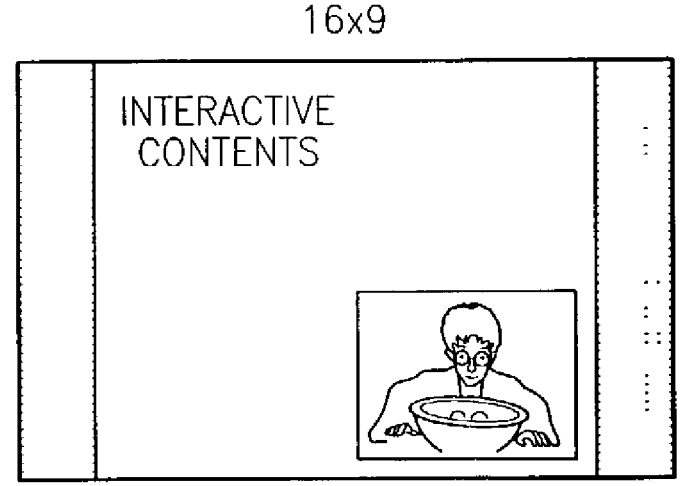

A scene in which 16×9 AV data is synthesized with a 4×3 markup document based on the above table is displayed on a display having a 16×9 screen size as follows. In an embedded mode, as shown in FIG. 22A, the 16×9 AV data synthesized with a 16×9 markup document is displayed in the embedded mode. In a background mode, as shown in FIG. 22B, the 16×9 AV data synthesized with the 16×9 markup document is displayed in the background mode. In a PIP mode, as shown in FIG. 22C, the 16×9 AV data synthesized with the 16×9 markup document is displayed in the PIP mode.

Reproducing methods according to an aspect ratio according to a yet still another embodiment of the present invention are largely classified by the static method using the CSS and a dynamic method using the API for the DOM. When the interactive contents are initially displayed in a scene, the interactive contents are displayed on a display through the static method using the default style sheet in the presentation engine 3 or the CSS defined by a "link" tag and a "style" tag in the markup document. However, when the aspect ratio is changed by a user's input during reproduction, the aspect ratio of an output screen can be dynamically changed by adding an aspect ratio conversion function using a script language to the markup document using the API for a DOM.

Hereinafter, the static method using the @screen-display rule will be described. Properties, such as viewport and window for a markup document and viewport and window for AV data, respectively, are defined in an improved @screen-display rule.

1. Screen-Display Type

4×3N: This case indicates that a user sets a screen output to a 4×3 normal shape, and this shape is a reduced shape of 16×9 AV data in which distortion in which a scene seems to be slim does not occur, unlike a conventional normal shape.

4×3L: If a user sets a screen output to a 4×3 letter box shape

4×3P: If a user sets a screen output to a 4×3 pan-and-scan shape

16×9W: If a user sets a screen output to a 16×9 wide shape

2. "Video-Placement" Property

Video-placement property designates a display mode of the AV scene. The modes include none, embedded, pip-# and background representing nothing is displayed, embedded mode, PIP mode, and background mode, respectively. An initial value is an embedded mode.

3. Background-Color Property

Background-color property designates a background color of a scene formed of a single color. A value is <color>, and an initial value may vary according to a user agent (UA).

4. "Document-Viewport" Property

Document-viewport property designates a trimming area of a markup document. A value is <shape>, and an initial value is rect (0%, 100%, 100%, 0%). Here, the value of the defined <shape> is rect(<top>,<right>,<bottom>,<left>).

5. "Document-Window" Property

Document-window property designates an area of a window in which a markup document is displayed on a screen of a display. A value is <shape>, and an initial value is rect (0%, 100%, 100%, 0%).

6. "Video-Viewport" Property

Video-viewport property designates a trimming area of the scene in which the AV scene is synthesized with the markup document scene. A value is <shape>, and an initial value is rect (0%, 100%, 100%, 0%).

7. "Video-Window" Property

Video-window property designates an area of a window in which the AV data is displayed on a screen of a display. A value is <shape>, and an initial value is rect (0%, 100%, 100%, 0%).

An example of a style sheet manufactured using the type and property of the @screen-display rule described above is as follows.

A default style sheet has different shapes depending on a presentation engine 3 installed in a reproducing apparatus, and it cannot be guaranteed that a scene is displayed as the manufacturer wants. When the manufacturer wants to display the scene as one wishes, a CSS or other mechanism to convey how to display the scene should be added to a markup document. The following default style sheet is a default style sheet installed in the presentation engine 3 with an assumption that the AV data and the markup document stored in a storage medium are manufactured for a 16×9 size. Values of <shape> used in the above example are based on the above-mentioned (conversion between the resolution of 720×480 having a 16×9 pixel aspect ratio and the resolution of 720×480 having a 4×3 pixel aspect ratio).

```
@screen-display 4×3N
{
    background-color : #000000
    document-viewport : (0px,629px,479px,90px)
    document-window : (0px,719px,479px,0px)
    video-viewport : (0px,719px,479px,0px)
    video-window : (0px,719px,479px,0px)
}
@screen-display 4×3L
{
    background-color : #000000
    document-viewport : (0px,719px,479px,0px)
    document-window : (60px,719px,419px,0px)
    video-viewport : (0px,719px,479px,0px)
    video-window : (60px,719px,419px,0px)
}
@screen-display 4×3P
{
    background-color : #000000
    document-viewport : (0px,629px,479px,90px)
    document-window : (0px,719px,479px,0px)
    video-viewport : (0px,629px,479px,90px)
    video-window : (0px,719px,479px,0px)
}
@screen-display 16×9W
{
    background-color : #000000
    document-viewport : (0px,719px,479px,0px)
    document-window : (0px,719px,479px,0px)
    video-viewport : (0px,719px,479px,0px)
    video-window : (0px,719px,479px,0px)
}
```

Since the default style sheet is differently set in each reproducing apparatus, a scene cannot be usually displayed as the manufacturer wants. Thus, preferably, the manufacturer makes an additional CSS in the markup document and attaches the CSS to the document so that the AV data and the markup document can be effectively displayed even at an aspect ratio set by the user. The following example shows how the manufacturer makes the CSS in the markup document so that AV data for the 16×9 size and a markup document for the 4×3 size can be effectively displayed in a "background mode." The CSS may be made using a "style" tag, as shown the following example, and may be used through external reference using a "link" tag.

```
<!DOCTYPE html PUBLIC "-//DVD//DTD XHTML DVD-HTML 1.0//EN"
                      "http://www.dvdforum.org/enav/dtd/dvdhtml-1-0.dtd">
<html>
    <head>
        <title>Example of aspect ratio change</title>
        <style type="text/css">
        @screen-display 4×3N
        {
            video-placement : background
            background-color : #000000
            document-viewport : (0px,719px,479px,0px)
            document-window : (0px,719px,479px,0px)
            video-viewport : (0px,629px,479px,90px) // If the entire area is selected
using a viewport area, AV data displayed as a background seems to be slim.
Thus, in order to solve this problem, the manufacturer just selects pan & scan.
A selection area may be varied by the manufacturer.
            video-window : (0px,719px,479px,0px)
        }
        @screen-display 4×3L
        {
            video-placement : background
            background-color : #000000
            document-viewport : (0px,719px,479px,0px)
            document-window : (60px,719px,419px,0px)
            video-viewport : (0px,719px,479px,0px)
            video-window : (60px,719px,419px,0px)
        }
        @screen-display 4×3P
        {
            video-placement : background
            background-color : #000000
            document-viewport : (0px,719px,479px,0px)
            document-window : (0px,719px,479px,0px)
            video-viewport : (0px,629px,479px,90px) // An area formed by cutting
the right and left sides of DVD-video will be selected.
            video-window : (0px,719px,479px,0px)
        }
        @screen-display 16×9W
        {
            video-placement : background
            background-color : #000000
            document-viewport : (0px,719px,479px,0px)
            document-window : (0px,629px,479px,90px) // In order to prevent a
markup document from distorting, a window area is reduced.
            video-viewport : (0px,719px,479px,0px)
            video-window : (0px,719px,479px,0px)
        }
        </style>
    </head>
    <body id="bodyNode">
        ...........................................................
    </body>
</html>
```

As above, the static method for displaying interactive contents according to a screen aspect ratio using the default style sheet or the CSS attached to the document by the manufacturer has been described.

Hereinafter, a dynamic method using an object source code of the API for the DOM will be described. The value of the object source code can be referred to using a script language in the markup document.

The following object source code is used to bind "ScreenDisplayProperties" in root elements (i.e., <frameset> and <html>) of the uppermost level.

```
Interface ScreenDisplayProperties {
    attribute ScreenDisplayRule screenDisplayInfo;
};
```

Here, "ScreenDisplayProperties" are connected to root elements of a markup document, and the value of "ScreenDisplayProperties" can be referred to using a script language in the markup document.

The definition and property of an interface definition language (IDL) are as follows.

```
IDL Definition
Interface ScreenDisplayRule
{
    readonly attribute unsigned short screenDisplayMode;
    attribute unsigned short      videoPlacement;
    attribute DOMString           colorBackground;
    attribute DOMString           documentviewport;
    attribute DOMString           documentwindow;
    attribute DOMString           videoviewport;
    attribute DOMString           videowindow;
};
Attributes
```

-continued

```
screenDisplayMode: An aspect ratio of an output scene set by a user
    const unsigned short SCREEN_DISPLAY_MODE_
        4x3NORMAL = 0;
    const unsigned short SCREEN_DISPLAY_MODE_
        4x3LETTERBOX = 1;
    const unsigned short SCREEN_DISPLAY_MODE_
        4x3PAN&SCAN = 2;
    const unsigned short SCREEN_DISPLAY_MODE_
        16x9WIDE = 3;
videoPlacement: It designates a display mode of a DVD-video
    const unsigned short VIDEO_PLACEMENT_NONE = 0;
    const unsigned short VIDEO_PLACEMENT_EMBEDDED = 1;
    const unsigned short VIDEO_PLACEMENT_BACKGROUND = 2;
    const unsigned short VIDEO_PLACEMENT_PIP = 3;
colorBackground: It has the value of <color> as a background color of
a
DVD-video scene.
documentviewport: It has the value of <shape> as a trimming area of a
markup document.
documentwindow: It has the value of <shape> as a window area on a
display
to which the trimmed markup document is to be mapped.
```

-continued

```
videoviewport: It has the value of <shape> as a trimming area of the
    DVD-video.
videowindow: It has the value of <shape> as a window area on a
    display to
which the trimmed DVD-video is to be mapped.    However, when
videoPlacement is in an embedded mode, the window area is restricted by
"width" and "height" defined by an <object> tag in the markup document.
```

The above-mentioned dynamic definition using the object source of the API for the DOM is implemented by a script language included in the markup document, as shown in the following example. The example is made by the manufacturer by considering event handling according to user's aspect ratio conversion of AV data for 16×9 (i.e., DVD-video) and a markup document for the 16×9 size, which are to be displayed in an embedded mode.

```
<?xml version ="1.0" encoding="UTF-8"?>
<!DOCTYPE html PUBLIC "-//DVD//DTD XHTML DVD-HTML 1.0//EN"
                     "http://www.dvdforum.org/envideo/dtd/dvdhtml-1-0.dtd">
<html>
    <head>
        <title>Example of aspect ratio change</title>
        <script type="text/javascript">
        <--
            function eventHandler(evt)
            {
            var vdi;
            if (evt.index == SCREEN_DISPLAY_MODE_CHANGE && (evt.param1
== 0))
                { // param1 == 0 : 4x3N
                    vdi = document.documentElement.ScreenDisplayInfo;
                    vdi.videoPlacement = 1;
                    vdi.colorBackground = "black";
                    vdi.documentviewport = "(0px,629px,479px,90px)"; // An area
formed by cutting right and left sides of a markup document is selected. In this
case, it is most preferable that the selected area is consistent with a "hot area".
                    vdi.documentwindow = "(0px,719px,479px,0px)";
                    vdi.videoviewport = "(0px,719px,479px,0px)"
                    // In an embedded state, vdi.videowindow is determined by "width"
and "height" of an <object> tag in the markup document, and thus the
manufacture sets the size of the window of the "object" tag so that the
DVD-video is displayed in a 16 × 9 size.
                }
            if (evt.index == SCREEN_DISPLAY_MODE_CHANGE && (evt.param1
== 1))
                { // param1 == 1 : 4x3L
                    vdi = document.documentElement.ScreenDisplayInfo;
                    vdi.videoPlacement = 1;
                    vdi.colorBackground = "black";
                    vdi.documentviewport = "(0px,629px,479px,90px)";
                    vdi.documentwindow = "(0px,719px,479px,0px)";
                    vdi.videoviewport = "(0px,719px,479px,0px)" // Even though the
entire DVD-video picture is selected, in a 4 × 3 letter box mode, it seems that
"Matte" is added to the upper and lower portions of a scene.
                }
            if (evt.index == SCREEN_DISPLAY_MODE_CHANGE && (evt.param1
== 2))
                { // param1 == 2 : 4x3P
                    vdi = document.documentElement.ScreenDisplayInfo;
                    vdi.videoPlacement = 1;
                    vdi.colorBackground = "black";
                    vdi.documentviewport = "(0px,629px,479px,90px)";
                    vdi.documentwindow = "(0px,719px,479px,0px)";
                    vdi.videoviewport = "(0px,629px,479px,90px)" // Part of a scene
formed by cutting right and left sides of the DVD-video picture will be selected.
                }
            if (evt.index == SCREEN_DISPLAY_MODE_CHANGE && (evt.param1
```

-continued

```
== 3))
            { // param1 == 3 : 16x9W
                vdi = document.documentElement.ScreenDisplayInfo;
                vdi.videoPlacement = 1;
                vdi.colorBackground = "black";
                vdi.documentviewport = "(0px,719px,479px,0px)";
                vdi.documentwindow = "(0px,719px,479px,0px)";
                vdi.videoviewport = "(0px,719px,479px,0px)"
            }
        }
    }
    -->
    </script>
    <script type="text/javascript">
    <--
        function setupEventHandler( )
        {
        // eventHandler is registered to bodyNode and Interactive Contents
        // SCREEN_DISPLAY_MODE_CHANGE == 500
            bodyNode.addEventListener("dvdvideo",eventHandler,true);
dvdVideo.SubscribeToEvent(SCREEN_DISPLAY_MODE_CHANGE,true);}
    -->
    </script>
    </head>
    <body id="bodyNode" onload="setupEventHandler( )">
    .........................................................
    </body>
</html>
```

The markup document is displayed in a scene through the initial static definition. Due to the occurrence of an event, such as the activation of a user's aspect ratio conversion key (or button) input, "vdi.screenDisplayMode" information is read. Thus, the aspect ratio of the scene is reconstituted using a script language included in the above markup document.

Figure 23:
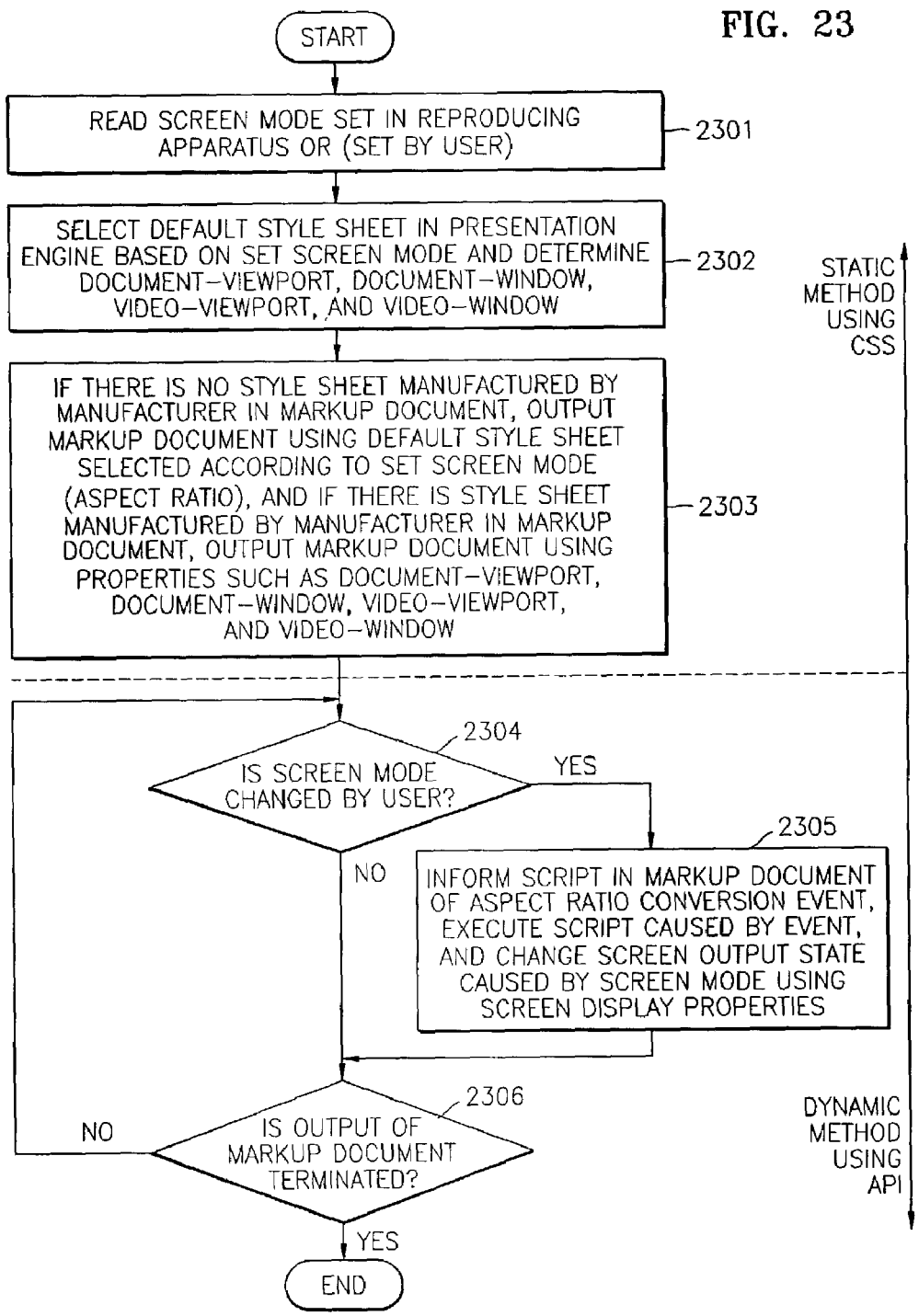
FIG. 23 is a flowchart of another preferred embodiment of a reproducing method according to the present invention.

FIG. 23 shows a flowchart of another embodiment of a reproducing method according to the present invention. Referring to FIG. 23, by using the above-mentioned static and dynamic definitions, the markup document scene is displayed according to a screen mode (aspect ratio, resolution, and video output method) set by the user or set in the reproducing apparatus. The screen mode can be changed even during reproduction through a user's input. Values of the viewport and the window of the markup document and the AV data applied in this case can be applied to a next markup document if these values are not changed in a next markup document.

In operation 2301, the presentation engine 3 reads the screen mode (aspect ratio, resolution, and video output method) set in the reproducing apparatus or the screen mode set by the user. Here, a video output method is for a 16×9 video that is output in a 4×3 letter box or 4×3 pan & scan, and 16×9 wide mode, which can be displayed without scene distortion.

In this case, even though a display is set to a 4×3 size, in an embedded mode or PIP mode, the AV decoder 2 does not output an AV stream in a letter box or pan-and-scan shape. Instead, the AV decoder outputs an AV stream for the 16×9 size, as if the display is set to a 16×9 size, without conversion. This is because the AV stream is generally encoded in the 16×9 size in the DVD reproducing apparatus.

In operation 2302, a default style sheet in the presentation engine 3 is selected based on the set screen mode. Properties, such as document viewport, document window, video viewport, and video window which are defined in the corresponding default style sheet, are determined. The presentation engine 3 interprets the markup document read by the reading unit 1 and checks a style sheet linked to or embedded in the markup document. In operation 2303, if there is no style sheet provided by the manufacturer in the markup document, the presentation engine 3 outputs the markup document to a scene, using the properties such as document viewport, document window, video viewport, and video window, which are defined in the default style sheet selected based on the set screen mode. If there is a style sheet provided by the manufacturer in the markup document, the presentation engine 3 outputs the markup document to the scene, using the properties such as document viewport, document window, video viewport, and video window, according to @screen-display, which are defined in the corresponding style sheet.

In operation 2304, it is determined whether the screen mode according to a user's aspect ratio conversion key (or button) is changed. In operation 2305, if the screen mode is changed by the user, the presentation engine 3 informs the corresponding markup document of an aspect ratio conversion event ASPECT_RATIO_CHANGE. The presentation engine 3 executes a script caused by the event, interprets a screen display property variable corresponding to the changed screen mode using ScreenDisplayProperties in the presentation engine 3, changes a screen output state of the markup document based on the interpreted information, and outputs a new markup document to the scene. In operation 2306, if the screen mode is not changed in operation 2304, it is determined whether the output of the markup document is terminated.

The above recording and reproducing methods can be implemented with a computer program. Program codes and code segments of the computer program can be made by a computer programmer skilled in the art. Also, the above program is stored in information storage media (computer readable media), read and executed by the computer, thereby performing a method for recording and reproducing a markup document and AV data. The information storage media include magnetic recording media, optical recording media, and carrier waves and in other forms such as firmware.

As described above, according to the present invention, an information storage medium including AV data and a markup document so that the AV data and the markup document can be displayed in various ways in an interactive mode that is responsive to the resolution and the aspect ratio (screen ratio). A recording method, a reproducing method, and a reproducing apparatus therefore are provided. As such, the user can enjoy a fine display scene. Further, a contents manufacturer and a recording and reproducing apparatus manufacturer can increase/reduce the markup document scene using the window and viewport properties, thereby sparing an available memory space and providing a special function, such as a scroll function. In addition, part of the AV scene can be increased or reduced using the property video-viewport, and interactive contents manufactured at one fixed screen ratio can be changed into various screen ratios, using the viewport and window properties for interactive contents.

According to the present invention, when the interactive contents manufactured at the fixed screen ratio are reproduced by the reproducing apparatus using the markup language, the interactive contents can be effectively displayed without a portion from which important information is subtracted, regardless of the screen ratio of the display, thereby simplifying an authoring process, avoiding contents overlapping and more effectively using a disc space.

In addition, the AV data and the markup document manufactured at the fixed aspect ratio can be effectively displayed on the display having various aspect ratios through a static method using a CSS related to an aspect ratio, and a dynamic method using a script language in the markup document using an API for a DOM. Thus, the user can enjoy a display state that is closest to a manufacturer's intention, and the manufacturer can more effectively use the storage medium by avoiding interactive contents overlapping.

While this invention has been particularly shown and described with reference to embodiments thereof, it will be understood by those skilled in the art that various changes in form and details may be made therein without departing from the spirit and scope of the invention as defined by the accompanying claims, and equivalents thereof.

What is claimed is:

1. A computer readable medium having a data structure encoded thereon so as to generate an interactive scene using the data contained in the data structure, the data comprising:
   AV data including audio data and video data from which an AV scene is generated;
   a markup document from which a markup document scene is generated; and
   scene synthesis information which describes and distinguishes between display modes in which the markup document scene and the AV scene are displayed together in the interactive scene.

2. The medium of claim 1, wherein one of the display modes includes an embedded mode in which the AV scene is embedded in at least part of the markup document scene to form a combined scene, and the combined scene is displayed as the interactive scene.

3. The medium of claim 1, wherein one of the display modes includes a picture in picture (PIP) mode in which the AV scene is displayed overlapping the markup document scene.

4. The medium of claim 1, wherein one of the display modes includes a background mode in which the AV scene and the markup document scene overlap each other to form a combined scene, and the combined scene is displayed as the interactive scene.

5. The medium of claim 4, wherein another of the display modes includes another background mode in which the markup document scene overlaps the AV scene to form another combined scene, and the another combined scene is displayed.

6. The medium of claim 1, wherein the scene synthesis information includes a style sheet linked to or embedded in the markup document.

7. The medium of claim 1, wherein the scene synthesis information includes a link tag recorded in the markup document, and a cascading style sheet (CSS) referenced by the link tag.

8. The medium of claim 7, wherein the CSS includes display mode designation information which designates a display mode of the AV scene.

9. The medium of claim 8, wherein the CSS further includes AV trimming area designation information which designates an area in which to one of increase and reduce a desired portion of the AV scene.

10. The medium of claim 8, wherein the CSS further includes background color designation information which designates a background color of the AV scene.

11. The medium of claim 8, wherein the CSS further includes trimming area designation information which designates a trimming area of a scene in which the AV scene is combined with the markup document.

12. The medium of claim 8, wherein the CSS further includes window designation information which designates a window in which a combined scene in which the AV scene is to be combined with the markup document so as to be displayed on the screen of a display.

13. The medium of claim 8, wherein the CSS further includes screen display type information representing an aspect ratio of a combined scene in which the AV scene is to be combined with the markup document scene.

14. The medium of claim 8, wherein the CSS further includes window designation information of the AV scene which designates an area of a window in which a trimmed AV scene is to be displayed on the screen of the display.

15. The medium of claim 7, wherein the scene synthesis information further includes an object having property variables to control the CSS, and a program to control the CSS on the basis of the object.

16. The medium of claim 15, wherein ones of the property variables includes property variables which designates a display mode of the AV scene.

17. The medium of claim 16, wherein one of the property variables includes a property variable which designates an area in which to one of increase and reduce a desired portion of the AV scene.

18. The medium of claim 16, wherein one of the property variables includes a property variable which designates a background color of the AV scene.

19. The medium of claim 16, wherein one of the property variables includes a property variable which designates a window in which a combined scene in which the AV scene is to be combined with the markup document so as to be displayed on the screen of the display.

20. The medium of claim 16, wherein one of the property variables includes a property variable which designates a trimming area in which a combined scene in which the AV scene is to be combined with the markup document so as to be displayed on the screen of the display.

21. The medium of claim 16, wherein one of the property variables includes a screen display mode representing an aspect ratio of a combined scene in which the AV scene is to be combined with the markup document scene.

22. The medium of claim 21, wherein one of the property variables includes a property variable which designates a window in which a combined scene in which the AV scene is to be combined with the markup document so as to be displayed on the screen of the display.

23. The medium of claim 1, further comprising reproduction control information for the AV data, wherein the AV data is decoded to generate the AV scene using the reproduction control information.

24. The medium of claim 23, further comprising a video directory and an interactive directory, wherein the AV data and the reproduction control information are recorded in the video directory, and the markup document and the scene synthesis information are recorded in the interactive directory.

25. A computer readable medium encoded with a data structure so as to generate an interactive scene using data contained in the data structure, the data comprising:
   AV data including audio data and video data from which an AV scene is generated, the AV scene having a first screen mode;
   a markup document from which a markup document scene is generated; and
   scene synthesis information useable by the apparatus to as to combine the markup document scene with the AV scene to generate the interactive scene without scene distortion of the AV scene due to a change from the first screen mode to a second screen mode, and comprising conversion data to convert between screen ratios and aspect ratios according to the changed screen mode.

26. The medium of claim 25, wherein the screen synthesis information is stored in a cascading style sheet (CSS) file associated with the markup document using one of a link tag and a style tag embedded in the markup document.

27. The medium of claim 26, wherein the screen synthesis information includes at least one of:
   screen display type information which designates an aspect ratio of a combined scene in which the AV scene is combined with the markup document scene,
   display mode designation information which designates a display mode of the AV scene,
   background color designation information which designates a background color of the combined scene,
   trimming area designation information of a trimming area of the combined scene in which the AV scene is combined with the markup document scene,
   window designation information which designates a window in which the combined scene is to be displayed on a screen of a display, and
   AV trimming area designation information which designates an area in which to one of increase and reduce a desired portion of the AV scene.

28. The medium of claim 27, wherein the display mode designation information indicates at least one of:
   an embedded mode in which the AV scene is embedded in at least part of the markup document scene,
   a picture in picture (PIP) mode in which the AV scene overlaps the markup document scene, and
   a background mode in which the markup document scene overlaps the AV scene.

29. The medium of claim 28, wherein the scene synthesis information is set so that:
   in the embedded mode of the interactive mode or PIP mode, when the AV data having a first aspect ratio and a first resolution is displayed on the display having a second aspect ratio and having a second resolution lower than the first resolution, the AV data is output at the first aspect ratio, and
   in the background mode of the interactive mode or video mode, the AV data is output in one of a pan-and-scan shape and a letterbox shape.

30. The medium of claim 27, wherein the markup document designates a first area of the AV scene in which contents which are to be displayed in a maximum area shown regardless of an aspect ratio of the display, and designates a second area of the AV scene in which other contents which are shown according to the aspect ratio of the display.

31. The medium of claim 30, wherein:
   when the markup document having a first aspect ratio and a first resolution is displayed on the display having a second aspect ratio and a second resolution lower than the first resolution of the first aspect ratio, the first area is selected using the trimming area designation information of the combined scene, and
   the selected first area is mapped to a designated area on the screen of the display using the window designation information of the combined scene.

32. The medium of claim 26, wherein the screen synthesis information includes at least one of:
   screen display type information which designates an aspect ratio of a combined scene in which the AV scene is combined with the markup document scene,
   display mode designation information which designates a display mode of the AV scene,
   background color designation information which designates a background color of the combined scene,
   markup document trimming area designation information which designates a trimming area of the markup document,
   markup document window designation information which designates a window in which the markup document scene is displayed on a screen of a display,
   AV trimming area designation information which designates an area in which to one of increase and reduce a desired portion of the AV scene, and
   window area designation information of the AV scene which designates a window in which only the AV scene is displayed on the screen of the display.

33. The medium of claim 32, wherein, when the AV data having a first aspect ratio and a first resolution is displayed on a display having a second aspect ratio and a second resolution lower than the first resolution, the scene synthesis information is set so that the AV data having the first aspect ratio is output without conversion.

34. The medium of claim 26, wherein the scene synthesis information further includes an object having property variables to control the CSS and a program to control the CSS on the basis of the object.

35. The medium of claim 34, wherein the property variables include at least one of:
   a screen display mode to designate an aspect ratio of a combined scene in which the AV scene is combined with the markup document scene,
   a property to designate a background color of the combined scene,
   a property to designate a trimming area of combined scene in which the AV scene is combined with the markup document scene,
   a property to designate a window in which the combined scene is to be displayed on a screen of a display, and a property to designate a trimming area in which to one of increase and reduce a desired portion of the AV scene.

36. The medium of claim 35, wherein:

the program includes command data, and in response to a screen mode conversion command received by the apparatus, the command data of the program is used by the apparatus to use an object source to control the property which designates the trimming area of the combined scene, the property which designates the window area of the combined scene, and a property which designates the trimming area of the AV scene according to the screen display mode including an aspect ratio, a screen ratio, and a video output mode so as to change the aspect ratio of the scene.

37. The medium of claim 35, wherein the property variables include at least one of:

a screen display mode which designates an aspect ratio of a combined scene in which the AV scene is combined with the markup document scene, a property which designates a display mode of the AV scene, a property which designates a background color of the scene, a property which designates a trimming area of the markup document scene, a property which designates a window in which the markup document scene is to be displayed on the screen of the display, a property which designates a trimming area in which to one of increase and reduce a desired portion of the AV scene, and a property which designates a window in which the AV scene is to be displayed on the screen of the display.

38. The medium of claim 37, wherein the program includes command data, and in response to a screen mode conversion command received by the apparatus, the command data is used by the apparatus to use an object source so as to control the property which designates the trimming area of the combined scene, the property which designates the window area of the markup document scene, the property which designates the trimming area of the AV scene, and the property which designates the window area of the AV scene according to the screen display mode so as to change the aspect ratio of the combined scene.

39. The medium of claim 25, wherein the conversion comprises:

a conversion of a 720×480 resolution having a 16×9 pixel aspect ratio into a 1×1 unit pixel aspect ratio, a conversion between a 854×480 resolution and 640×480 resolution with each having a 1×1 unit pixel aspect ratio, a conversion of a 720×480 resolution having a 4×3 pixel aspect ratio into a 1×1 unit pixel aspect ratio, a conversion of a 720×480 resolution having a 4×3 pixel aspect ratio into a 1×1 unit pixel aspect ratio, and a conversion between a 720×480 resolution having a 16×9 pixel aspect ratio and a 720×480 resolution having a 4×3 pixel aspect ratio.

40. The medium of claim 27, wherein the screen display type information includes a 4×3 normal, a 4×3 letterbox, a 4×3 pan-and-scan, and a 16×9 wide.

41. An apparatus which reproduces AV data, which includes audio data and video data, and a markup document which are recorded on an information storage medium, the apparatus comprising:

a reading unit which reads the AV data and the markup document from the information storage medium;

a decoder which decodes the AV data read by the reading unit and outputs an AV scene and a controller which interprets the markup document read by the reading unit and outputs a markup document scene, interprets scene synthesis information which describes display modes so as to display the markup document scene together the AV scene in a combined scene, and outputs data so as to allow the combined scene to be displayed in one of the display modes according to the interpreted scene synthesis information.

42. The apparatus of claim 41, wherein the scene synthesis information includes at least one of:

display mode designation information which designates a display mode of the AV scene, background color designation information which designates a background color of the combined scene, trimming area designation information which designates a trimming area of the combined scene in which the AV scene is combined with the markup document scene, window designation information which designates a window in which the combined scene is to be displayed on a screen of a display, and AV trimming area designation information which designates an area in which to one of increase and reduce a desired portion of the AV scene.

43. The apparatus of claim 42, wherein the display mode designation information indicates at least one of:

an embedded mode in which the AV scene is embedded in at least part of the markup document scene, a picture in picture (PIP) mode in which the AV scene overlaps the markup document scene, and a background mode in which the markup document scene overlaps the AV scene.

44. The apparatus of claim 41, wherein the controller further interprets a cascading style sheet (CSS) associated with the markup document, interprets a program which uses property variables to control the CSS, and controls the CSS.

45. The apparatus of claim 44, wherein, in accordance with a received increase/reduce command, the controller uses the program and an embedded object source so as to control one of the property variables which designates a display mode of the AV scene, and another of the property variables which designates a trimming area of the AV scene in which to one of increase and reduce the desired portion of the AV scene.

46. The apparatus of claim 41, further comprising a blender which combines the AV scene and the markup document scene to be displayed together using the output data from the controller, wherein the controller further outputs the data to the blender according to the interpreted scene synthesis information.

47. An apparatus which reproduces AV data, which includes audio data and video data, and a markup document which are recorded on an information storage medium, the apparatus comprising:

a reading unit which reads the AV data and the markup document from the information storage medium;

a decoder which decodes the AV data read by the reading unit and outputs an AV scene; and a controller which interprets scene synthesis information corresponding to a scene mode set by the reproducing apparatus or by a received command, interprets the markup document to be displayed as a markup document scene in a combined scene in which the markup document scene is to be displayed together with the AV scene using the interpreted scene synthesis information, outputs data so as to allow the combined scene to be displayed, and changes an output state of the markup document scene in response to a scene mode change.

48. The apparatus of claim 47, wherein the scene synthesis information includes at least one of:
screen display type information which designates an aspect ratio of the combined scene in which the AV scene is combined with the markup document scene,
display mode designation information which designates a display mode of the AV scene,
background color designation information which designates a background color of the combined scene,
trimming area designation information which designates a trimming area of the combined scene in which the AV scene is combined with the markup document scene,
window designation information which designates a window in which the combined scene is to be displayed on a screen of a display, and
AV trimming area designation information which designates an area to increase and reduce a desired portion of the AV scene.

49. The apparatus of claim 48, wherein the display mode designation information indicates at least one of:
an embedded mode in which the AV scene is embedded in at least part of the markup document scene,
a picture in picture (PIP) mode in which the AV scene overlaps the markup document scene, and
a background mode in which the markup document scene overlaps the AV scene.

50. The apparatus of claim 49, wherein the controller further:
interprets a cascading style sheet (CSS) associated with the markup document,
interprets a program which uses property variables used to control the CSS, and controls the CSS.

51. The apparatus of claim 50, wherein, in response to a received scene mode change command, the controller uses the program to control one of the property variables which designates a trimming area of the combined scene, another of the property variables which designates a window area of the combined scene, and an additional one of the property variables which designates a trimming area of the AV scene in the style sheet file interpreted according to a screen display property.

52. The apparatus of claim 49, wherein,
when the AV data output by the decoder has a first aspect ratio and a first resolution and is to be displayed on the display having a second aspect ratio and a second resolution lower than the first resolution, the controller controls the combined scene to be displayed in the embedded mode of an interactive mode or the PIP mode, and
when the AV data output by the decoder is in a pan-and-scan or a letterbox shape, the controller controls the combined scene to be displayed in the background mode of the interactive mode or the video mode.

53. The apparatus of claim 50, wherein the scene synthesis information includes at least one of:
screen display type information which designates an aspect ratio of the combined scene in which the AV scene is to be combined with the markup document scene,
display mode designation information which designates a display mode of the AV scene,
background color designation information which designates a background color of the combined scene,
markup document trimming area designation information which designates a trimming area of the markup document,
markup document window designation information which designates a window in which the markup document scene is to be displayed on the screen of the display, and
window area designation information of the AV scene which designates a window in which the AV scene is to be displayed on the screen of the display.

54. The apparatus of claim 53, wherein, in response to a received scene mode change command, the controller uses the program and an object source to control the property which designates the markup document trimming area of the markup document scene, the property which designates the markup document window area of the markup document scene, the property which designates the AV trimming area of the AV scene, and the property which designates the AV window area of the AV scene in the style sheet file interpreted according to the screen display property so as to change an aspect ratio of the combined scene.

55. The apparatus of claim 54, wherein, when the AV data has a first aspect ratio and a first resolution and is to be displayed on a display having a second aspect ratio and a second resolution lower than the first resolution, the AV data having the first aspect ratio is output by the decoder without conversion to be displayed using the markup document trimming area designation information and the markup document window area designation information of the markup document scene and the AV trimming area designation information and the AV window area designation information of the AV scene.

56. The apparatus of claim 47, further comprising a blender combines the AV scene and the markup document scene to be displayed together using the output data from the controller, wherein the controller further outputs the data to the blender according to the interpreted scene synthesis information.

* * * * *